US012574530B2

(12) United States Patent
Verba et al.

(10) Patent No.: US 12,574,530 B2
(45) Date of Patent: Mar. 10, 2026

(54) TEMPLATE AVAILABILITY FOR TEMPLATE MATCHING TOOLS

(71) Applicant: QUALCOMM Incorporated, San Diego, CA (US)

(72) Inventors: Gleb Verba, Munich (DE); Zhi Zhang, Munich (DE); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/632,979

(22) Filed: Apr. 11, 2024

(65) Prior Publication Data

US 2024/0348799 A1 Oct. 17, 2024

Related U.S. Application Data

(60) Provisional application No. 63/496,378, filed on Apr. 14, 2023.

(51) Int. Cl.
H04N 19/176 (2014.01)
G06V 10/75 (2022.01)
H04N 19/96 (2014.01)

(52) U.S. Cl.
CPC ......... H04N 19/176 (2014.11); G06V 10/751 (2022.01); H04N 19/96 (2014.11)

(58) Field of Classification Search
CPC .... H04N 19/176; H04N 19/96; H04N 19/105; G06V 10/751

USPC ..................................................... 375/240.12
See application file for complete search history.

(56) References Cited

U.S. PATENT DOCUMENTS

2020/0021833 A1* 1/2020 Xu ........................ H04N 19/176

OTHER PUBLICATIONS

Naser et al. ("[AHG12] On Intra TMP Boundary Conditions", JVET-W0069, Jul. 7-16, 2021). (Year: 2021).*
Coban et al. (Algorithm description of Enhanced Compression Model 7 (ECM 7), JVET-AB2025, Oct. 20-28, 2022). (Year: 2022).*

(Continued)

*Primary Examiner* — Matthew K Kwan
(74) *Attorney, Agent, or Firm* — Shumaker & Sieffert, P.A.

(57) ABSTRACT

Example techniques are disclosed for coding video data. An example device for coding video data includes one or more processors. The one or more processors are configured to determine a current template of a current block of video data. The one or more processors are configured to determine a potential reference block in a picture of the video data for the current block. The one or more processors are configured to determine that the potential reference block and a reference template of the potential reference block are entirely within the picture, the reference template having a same shape as the current template. The one or more processors are configured to, based on the potential reference block and the reference template both being entirely within the picture, perform template matching between the reference template and the current template and code the current block based on the template matching.

32 Claims, 17 Drawing Sheets

| ABOVE-LEFT PART 902 | ABOVE PART 904 | } T |
| LEFT PART 906 | CURRENT BLOCK 900 | } H |

T ⏟ W

(56)                    References Cited

OTHER PUBLICATIONS

Coban M., et al., "Algorithm Description of Enhanced Compression Model 7 (ECM 7)", Joint Video Experts Team (JVET) of ITU-T SG 16 WP 3 and ISO/IEC JTC 1/SC 29, 28th Meeting, Mainz, DE, Oct. 20, 2022-Oct. 28, 2022, No. JVET-AB2025, m61505, Dec. 22, 2022, XP030306363, 62 pages, section 3.2.3 Template matching (TM), section 3.2.23 IBC with Template Matching.

International Search Report and Written Opinion—PCT/US2024/024214—ISA/EPO—Jul. 19, 2024 13 Pages.

Naser K (Interdigital)., et al., "[AHG12] On Intra TMP Boundary Conditions", Joint Video Experts Team (JVET) of ITU-T SG 16 WP 3 and ISO/IEC JTC 1/SC 29, 23rd Meeting, by teleconference, Jul. 7, 2021-Jul. 16, 2021, No. JVET-W0069, m57183, Jul. 7, 2021, XP030295933, 3 pages, abstract, section 1 Introduction, section 2 Proposal.

Bross B., et al., "Versatile Video Coding Editorial Refinements on Draft 10", JVET-T2001-v2, Joint Video Experts Team (JVET) of ITU-T SG 16 WP 3 and ISO/IEC JTC 1/SC 2920th Meeting, by Teleconference, Oct. 7-16, 2020, pp. 1-515.

Chen J., et al., "Algorithm Description for Versatile Video Coding and Test Model 10 (VTM 10)", JVET-S2002-v1, Joint Video Experts Team (JVET)of ITU-T SG 16 WP 3 and ISO/IEC JTC 1/SC 29/WG 1119th Meeting: by teleconference, Jun. 22-Jul. 1, 2020, pp. 1-99, JVET-S2002-v2.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Chen J., et al., "Algorithm Description for Versatile Video Coding and Test Model 4 (VTM 4)", JVET-M1002-v2, Joint Video Experts Team (JVET) of ITU-T SG 16 WP 3 and ISO/IEC JTC 1/SC 29/WG 11 13th Meeting, Marrakech, MA, Jan. 9-18, 2019, pp. 1-64.

Chen Y-W., et al., "Description of 360° Video Coding Technology Proposal by Qualcomm and Technicolor—Low and High Complexity Versions", JVET-J0021, JVET-F0025, JVET-G0058, Apr. 14, 2018, 4 Pages.

Coban M., et al., "Algorithm Description of Enhanced Compression Model 6 (ECM 6)", JVET-AA2025, Joint Video Experts Team (JVET) of ITU-T SG 16 WP 3 and ISO/IEC JTC 1/SC 29 27th Meeting, by Teleconference, Jul. 13-22, 2022, pp. 1-54, JVET-AA2025-v1.

Coban M., et al., "Algorithm Description of Enhanced Compression Model 8 (ECM 8)", JVET-AC2025, Joint Video Experts Team (JVET) of ITU-T SG 16 WP 3 and ISO/IEC JTC 1/SC 29, 29th Meeting, by teleconference, Jan. 11-20, 2023, pp. 1-74, JVET-AC2025-v1.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Naser K., et al., "[AHG12] On Intra TMP Boundary Conditions", InterDigital, JVET-W0069, Joint Video Experts Team (JVET) of ITU-T SG 16 WP 3 and ISO/IEC JTC 1/SC 29, 23rd Meeting, by teleconference, Jul. 7-16, 2021, pp. 1-3, JVET-W0069-r1.

Naser K., et al., "EE2: Intra Template Matching", InterDigital, JVET-V0130-v6, Joint Video Experts Team (JVET) of ITU-T SG 16 WP 3 and ISO/IEC JTC 1/SC 29 22nd Meeting, by teleconference, Apr. 20-28, 2021, pp. 1-7.

Seregin V., et al., "Exploration Experiment on Enhanced Compression Beyond VVC Capability (EE2)", Joint Video Experts Team (JVET) of ITU-T SG 16 WP 3 and ISO/IEC JTC 1/SC 29, JVET-AC2024-v2, 29th Meeting, by teleconference, Jan. 11-20, 2023, pp. 1-30.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, Jan. 1, 2012, 20 Pages.

Verba G., et al., "Non-EE2: Fixes for IntraTMP Template Availability", JVET-AD0239-v1, Joint Video Experts Team (JVET) of ITU-T SG 16 WP 3 and ISO/IEC JTC 1/SC 29, 30th Meeting, Antalya, TR, Apr. 21-28, 2023, pp. 1-4, JVET-AD0239-v4.

Wang Y-K., et al., "High Efficiency Video Coding (HEVC) Defect Report", JCTVC-N1003-v1, Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013, 311 Pages, JCTVC-N1003.

* cited by examiner

| SEARCH PATTERN | AMVR 4-PEL | AMVR FULL-PEL | AMVR HALF-PEL | AMVR QUARTER-PEL | MERGE MODE ALTIF=0 | MERGE MODE ALTIF=1 |
|---|---|---|---|---|---|---|
| 4-PEL DIAMOND | ✓ | | | | | |
| 4-PEL CROSS | ✓ | | | | | |
| FULL-PEL DIAMOND | | ✓ | ✓ | ✓ | ✓ | ✓ |
| FULL-PEL CROSS | | ✓ | ✓ | ✓ | ✓ | ✓ |
| HALF-PEL CROSS | | | ✓ | ✓ | ✓ | ✓ |
| QUARTER-PEL CROSS | | | | ✓ | ✓ | |
| 1/8-PEL CROSS | | | | | ✓ | |

TABLE 1

FIG. 4

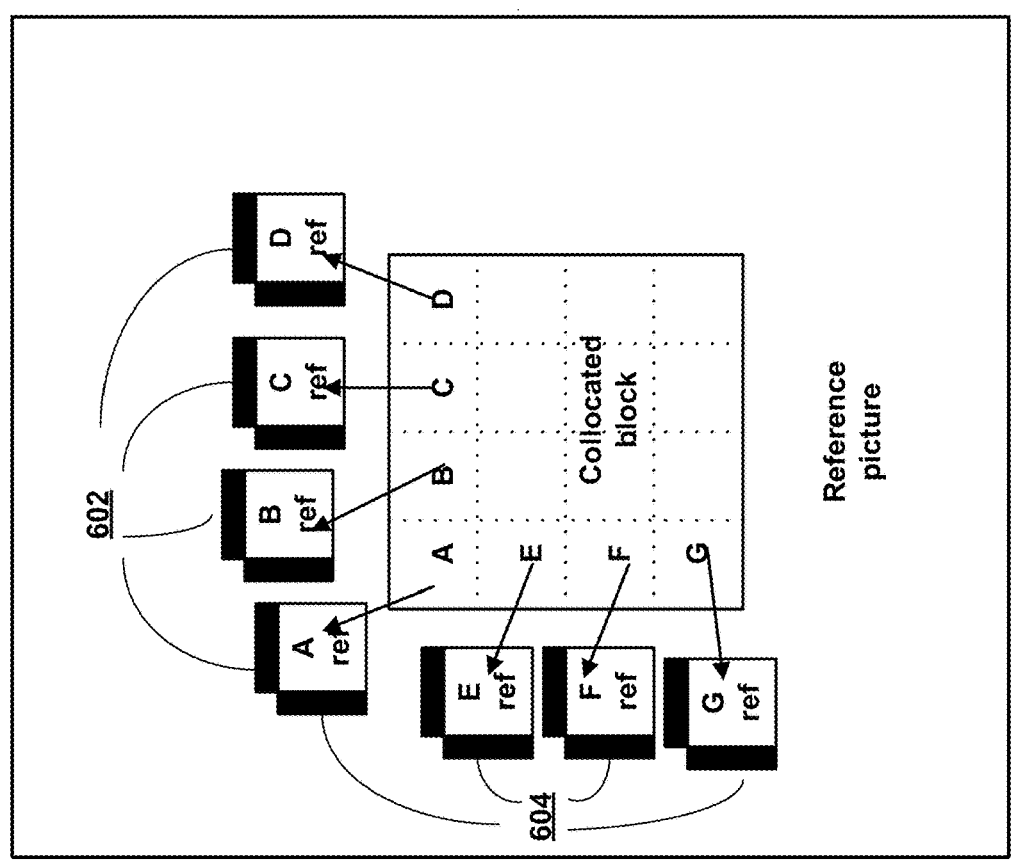
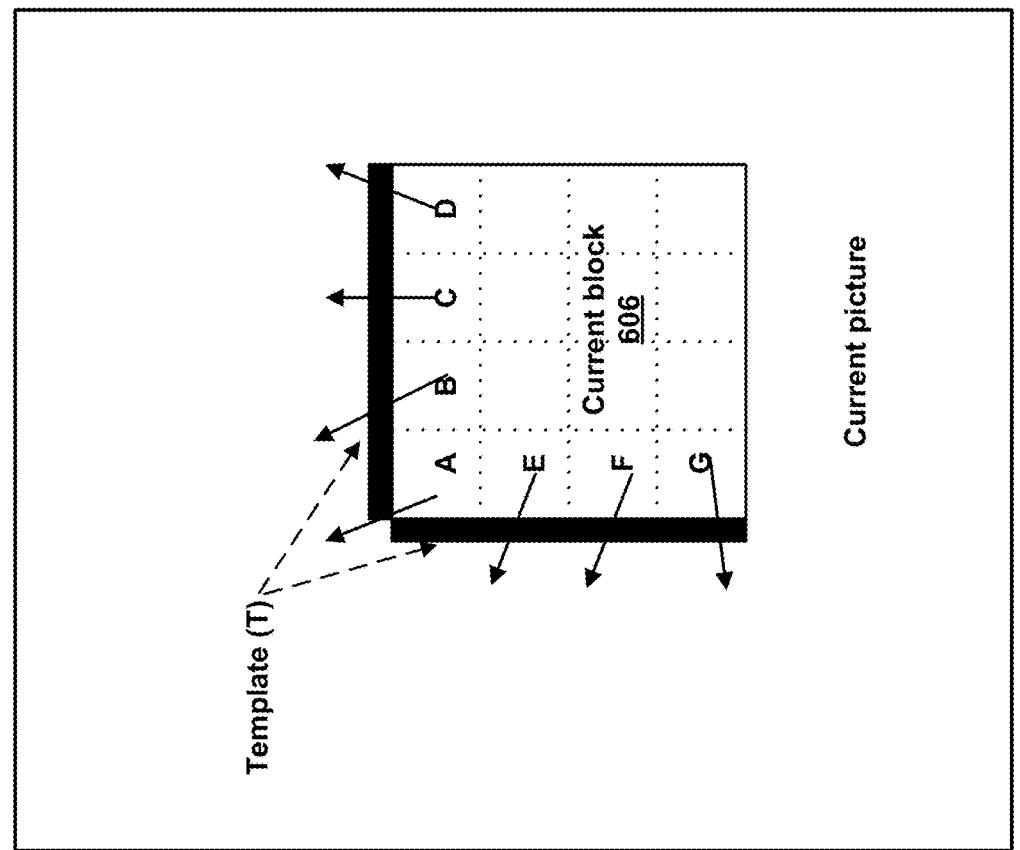
FIG. 6

| PARTITION ANGLE | 0 | 2 | 3 | 4 | 5 | 8 | 11 | 12 | 13 | 14 |
|---|---|---|---|---|---|---|---|---|---|---|
| 1ST PARTITION | A | A | A | A | L+A | L+A | L+A | L+A | A | A |
| 2ND PARTITION | L+A | L+A | L+A | L | L | L | L | L+A | L+A | L+A |
| PARTITION ANGLE | 16 | 18 | 19 | 20 | 21 | 24 | 27 | 28 | 29 | 30 |
| 1ST PARTITION | A | A | A | A | L+A | L+A | L+A | L+A | A | A |
| 2ND PARTITION | L+A | L+A | L+A | L | L | L | L | L+A | L+A | L+A |

TABLE 2

FIG. 7

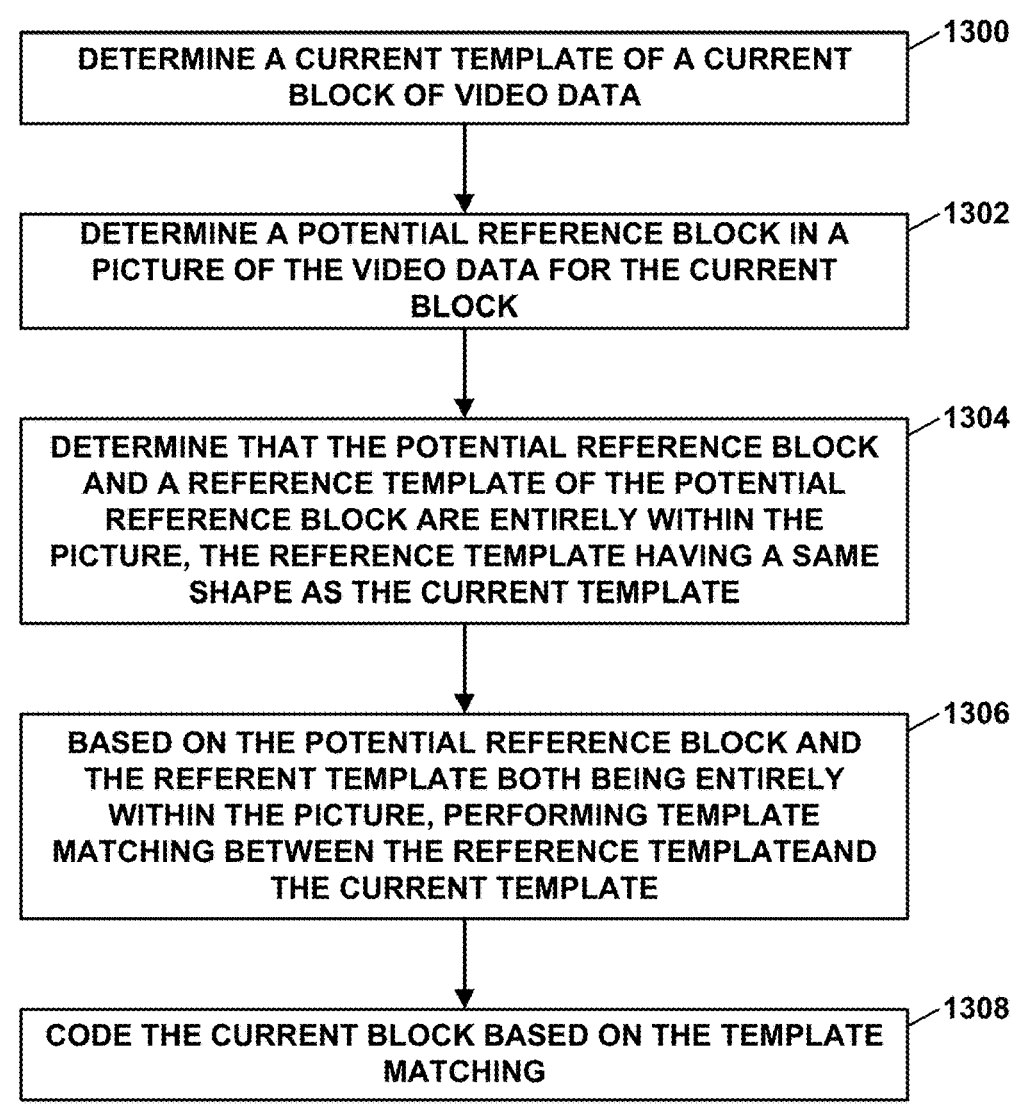

DETERMINE A CURRENT TEMPLATE OF A CURRENT BLOCK OF VIDEO DATA                                1300

DETERMINE A POTENTIAL REFERENCE BLOCK IN A PICTURE OF THE VIDEO DATA FOR THE CURRENT BLOCK                                1302

DETERMINE THAT THE POTENTIAL REFERENCE BLOCK AND A REFERENCE TEMPLATE OF THE POTENTIAL REFERENCE BLOCK ARE ENTIRELY WITHIN THE PICTURE, THE REFERENCE TEMPLATE HAVING A SAME SHAPE AS THE CURRENT TEMPLATE                                1304

BASED ON THE POTENTIAL REFERENCE BLOCK AND THE REFERENT TEMPLATE BOTH BEING ENTIRELY WITHIN THE PICTURE, PERFORMING TEMPLATE MATCHING BETWEEN THE REFERENCE TEMPLATEAND THE CURRENT TEMPLATE                                1306

CODE THE CURRENT BLOCK BASED ON THE TEMPLATE MATCHING                                1308

FIG. 13

350
PREDICT CURRENT BLOCK

352
CALCULATE RESIDUAL BLOCK
FOR CURRENT BLOCK

354
TRANSFORM AND QUANTIZE
RESIDUAL BLOCK

356
SCAN TRANSFORM
COEFFICIENTS OF RESIDUAL
BLOCK

358
ENTROPY ENCODE
TRANSFORM COEFFICIENTS

360
OUTPUT ENTROPY ENCODED
DATA OF BLOCK

TEMPLATE AVAILABILITY FOR TEMPLATE MATCHING TOOLS

This application claims the benefit of U.S. Provisional Application No. 63/496,378, filed Apr. 14, 2023, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for template matching in video coding. Current template matching search algorithms have excessive limitations with regard to search areas close to a picture boundary and to the reconstructed area boundary (e.g., the boundary of an area that has been reconstructed). The techniques described herein may improve the quality of coded video by addressing these shortcomings of current template matching search algorithms. For example, the techniques described herein may provide for additional potential reference blocks to be considered for situations where a potential reference block and/or a current block may be close to a picture boundary or reconstructed area boundary.

In one example, a method includes: determining a current template of a current block of the video data; determining a potential reference block in a picture of the video data for the current block; determining that the potential reference block and a reference template of the potential reference block are entirely within the picture, the reference template having a same shape as the current template; based on the potential reference block and the reference template both being entirely within the picture, performing template matching between the reference template and the current template; and coding the current block based on the template matching.

In another example, a device includes one or more memories configured to store video data and one or more processors implemented in circuitry and communicatively coupled to the one or more memories, the one or more processors being configured to: determine a current template of a current block of the video data; determine a potential reference block in a picture of the video data for the current block; determine that the potential reference block and a reference template of the potential reference block are entirely within the picture, the reference template having a same shape as the current template; based on the potential reference block and the reference template both being entirely within the picture, perform template matching between the reference template and the current template; and code the current block based on the template matching.

In another example, computer-readable storage media is encoded with instructions which, when executed, cause one or more processors to: determine a current template of a current block of video data; determine a potential reference block in a picture of the video data for the current block; determine that the potential reference block and a reference template of the potential reference block are entirely within the picture, the reference template having a same shape as the current template; based on the potential reference block and the reference template both being entirely within the picture, perform template matching between the reference template and the current template; and code the current block based on the template matching.

The details of one or more examples are set forth in the accompanying drawings and the description below. Other features, objects, and advantages will be apparent from the description, drawings, and claims.

BRIEF DESCRIPTION OF DRAWINGS

FIG. 4 is a tabular diagram illustrating search patterns of adaptive motion vector resolution (AMVR) and merge mode with AMVR.

FIG. 6 is a conceptual diagram illustrating template and reference samples for block with subblock motion using the motion information of the subblocks of the current block.

FIG. 7 is a tabular diagram illustrating Template for the $1^{st}$ and $2^{nd}$ geometric partitions, where A represents using above samples, L represents using left samples, and L+A represents using both left and above samples.

FIG. 13 is a flowchart illustrating example template matching techniques according to one or more aspects of this disclosure.

DETAILED DESCRIPTION

For some video content, current template matching search algorithms may have excessive limitations with regard to search areas close to a picture boundary and to the reconstructed area boundary. By restricting potential matching templates to these limited search areas close to a picture boundary or to a reconstructed area boundary, the template matching search algorithms in some instances exclude better matches. This may unduly limit coding efficiency and/or decoded picture quality. The techniques described herein may improve the coding efficiency and/or quality of coded video by addressing these shortcomings of current template matching search algorithms.

Figure 1:
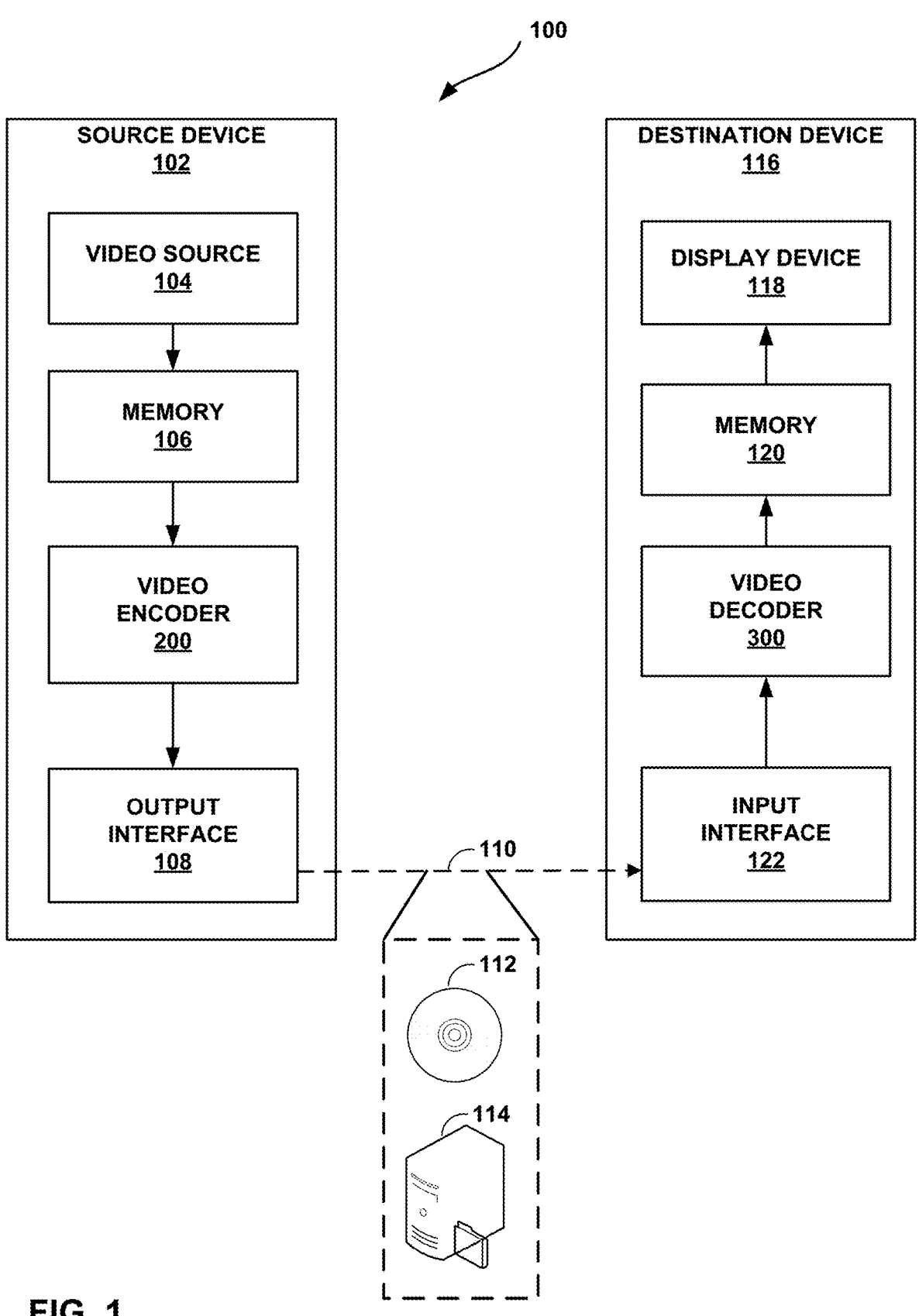
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for template matching. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for template matching. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use template matching.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an NxN block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an MxN block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "NxN" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an NxN CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include NxM samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, a method includes: determining a current template of a current block of the video data; determining a potential reference block in a picture of the video data for the current block; determining that the potential reference block and a reference template of the potential reference block are entirely within the picture, the reference template having a same shape as the current template; based on the potential reference block and the reference template both being entirely within the picture, performing template matching between the reference template and the current template; and coding the current block based on the template matching.

In another example, a device includes one or more memories configured to store video data and one or more processors implemented in circuitry and communicatively coupled to the one or more memories, the one or more processors being configured to: determine a current template of a current block of the video data; determine a potential reference block in a picture of the video data for the current block; determine that the potential reference block and a reference template of the potential reference block are entirely within the picture, the reference template having a same shape as the current template; based on the potential reference block and the reference template both being entirely within the picture, perform template matching between the reference template and the current template; and code the current block based on the template matching.

In another example, computer-readable storage media is encoded with instructions which, when executed, cause one or more processors to: determine a current template of a current block of video data; determine a potential reference block in a picture of the video data for the current block; determine that the potential reference block and a reference template of the potential reference block are entirely within the picture, the reference template having a same shape as the current template; based on the potential reference block and the reference template both being entirely within the picture, perform template matching between the reference template and the current template; and code the current block based on the template matching.

This disclosure is related to different techniques (e.g., template type, fusion, etc.) for use in template matching (TM) related tools. The disclosed techniques may be applied to any of the existing video codecs, such as HEVC (High Efficiency Video Coding), VVC (Versatile Video Coding), Essential Video Coding (EVC), Joint Exploration Model (JEM), or may be applied to an efficient coding tool in future video coding standards (e.g., ECM (Enhanced Compression Model)).

In this section, techniques of HEVC, JEM, and VVC related to the disclosed techniques are discussed. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC) or ITU-T H.265, including its range extension, multi-view extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

The latest HEVC draft specification, and referred to as HEVC WD hereinafter, is available from phenix.int-evry.fr/jct/doc_end_user/documents/14_Vienna/wg11/JCTVC-N1003-v1.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The latest version of reference software, i.e., VVC Test Model 10 (VTM 10) may be downloaded from: vcgit.hhi.fraunhofer.de/jvet/VVCSoftware_VTM. The Versatile Video Coding (VVC) draft specification may be referred to as JVET-T2001. An algorithm description of Versatile Video Coding and Test Model 10 (VTM 10.0) may be referred to as JVET-T2002. Alliance for Open Media (AOM) video coding formats, such as AV1, AV2 may also be utilized.

Intra template matching prediction (intra TMP) is a special intra prediction mode that copies a prediction block (e.g., a best prediction block) from the reconstructed part of the current frame, whose L-shaped, left, or above template matches the current template. For a predefined search range, the video encoder (e.g., video encoder 200) searches for the most similar template to the current template in a reconstructed part of the current frame and uses the corresponding block as a prediction block. The video encoder then signals the usage of this mode, and the same prediction operation is performed at the video decoder (e.g., video decoder 300).

Figure 2:
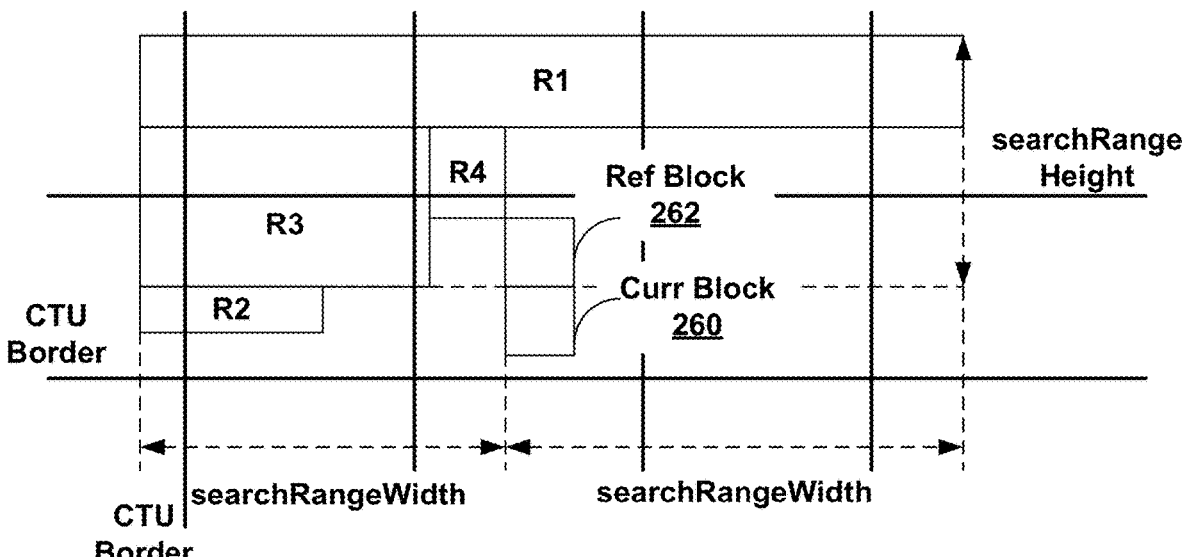
FIG. 2 is a conceptual diagram illustrating example intra template matching search areas.

FIG. 2 is a conceptual diagram illustrating example intra template matching search areas. The prediction signal is generated by matching the L-shaped, left, or above causal neighbor of current block 260 with another block (e.g., reference block 262) in a predefined search area including a search area R1, R2, R3, or R4.

In some examples, the search areas may be different than shown in the example of FIG. 2. For example, R1 may include above CTUs, R2 may include CTUs left and below the current block, R3 may include left CTUs above the current block and a left part of the current CTU, and R4 may include a right part of the current CTU.

Figure 9:
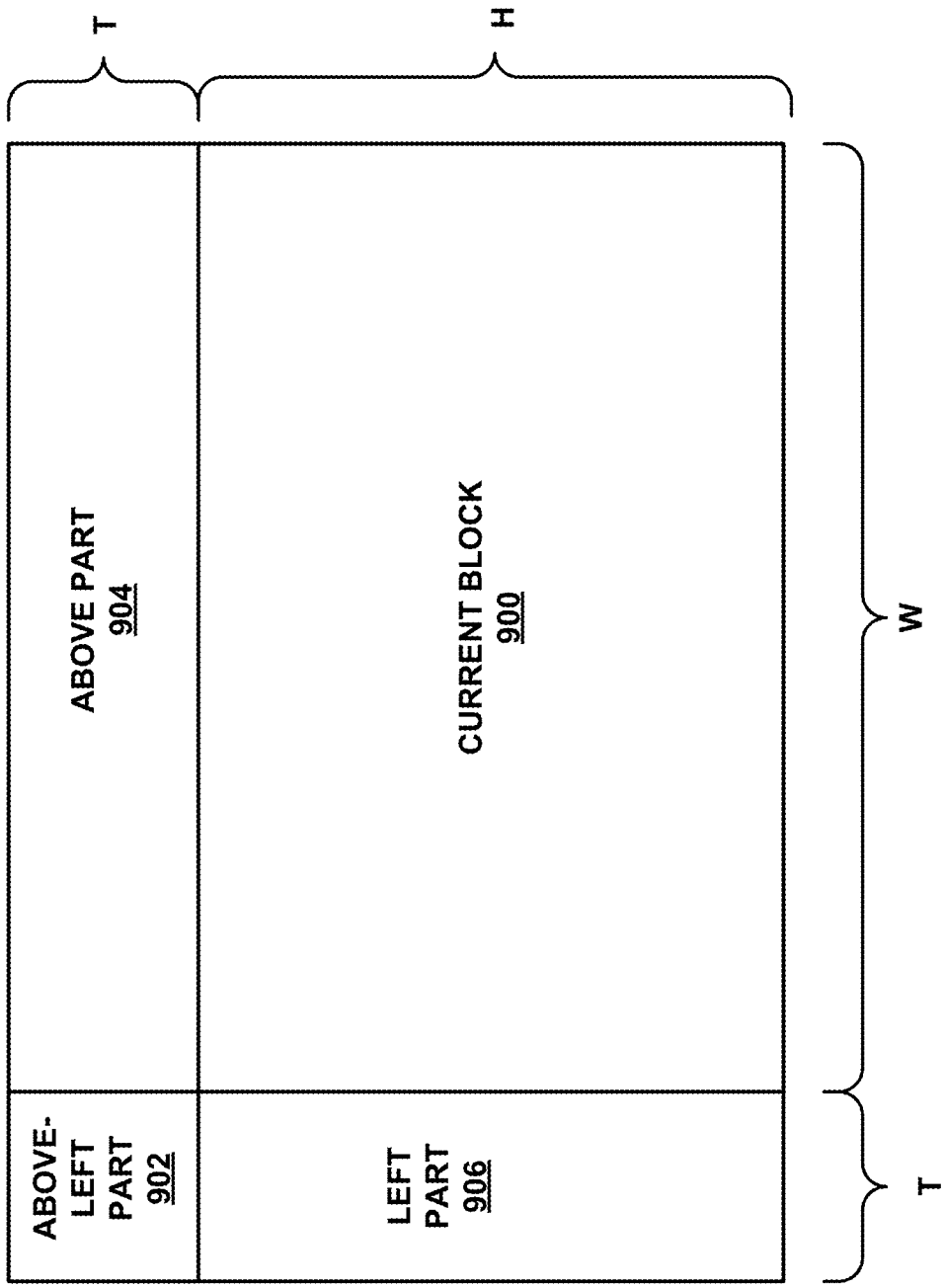
FIG. 9 is a conceptual diagram illustrating example template parts.

An L-shaped template includes left, above, and above-left template parts as shown in FIG. 9 discussed hereinafter. Video encoder 200 or video decoder 300 may use a sum of absolute differences (SAD) as a cost function to determine a matching template. For example, video encoder 200 or video decoder 300 may the determine the template having the lowest SAD from the template of the current block to be the matching template.

Within each region, for example, video decoder 300 may search for the template that has least SAD with respect to the current template and use the template's corresponding block as a prediction block (e.g., a reference block). For example, video decoder 300 may select a reference block from a plurality of potential reference blocks as being the potential reference block having the template with the lowest template matching cost.

The dimensions of regions (SearchRange_w, SearchRange_h) may be set proportional to the block dimension (BlkW, BlkH) to have a fixed number of SAD comparisons per pixel. That is:

$$SearchRange\_w = a * BlkW$$

$$SearchRange\_h = a * BlkH$$

Where 'a' is a constant that controls the gain/complexity trade-off. In practice, 'a' is often equal to 5.

In one example, the minimal value for dimension of regions (SearchRange_w, SearchRange_h) can be set:

$$SearchRange\_w = min(minSize, a * BlkW)$$

$$SearchRange\_h = min(minSize, a * BlkH)$$

Where "minSize" is a minimal size for the search area dimension. In practice, "minSize" is often equal to 64.

The intra template matching tool may be enabled for CUs with size less than or equal to 64 in width and height. This maximum CU size for intra template matching may be configurable.

The intra TMP mode may be signaled at a CU level through a dedicated flag when decoder-side intra mode derivation (DIMD) is not used for a current CU. For example, video encoder 200 may signal the intra TMP mode to video decoder 300 via a dedicated flag.

The search region (R1 to R4 in FIG. 2) may be sub-sampled by an integer factor. This reduces the template matching search by a factor of, for example, 4. After finding the best template match, a multi-stage refinement process may be performed in which another template matching search is performed around the best match with a reduced search range restricted to the zone from the set R1, R2, R3, R4 in which the best match was found at the first stage. The refined search range may be defined as min (w,h)/2, where w and h are the current CU width and height. For example, video encoder 200 or video decoder 300 may perform the multi-stage refinement process.

Figure 3:
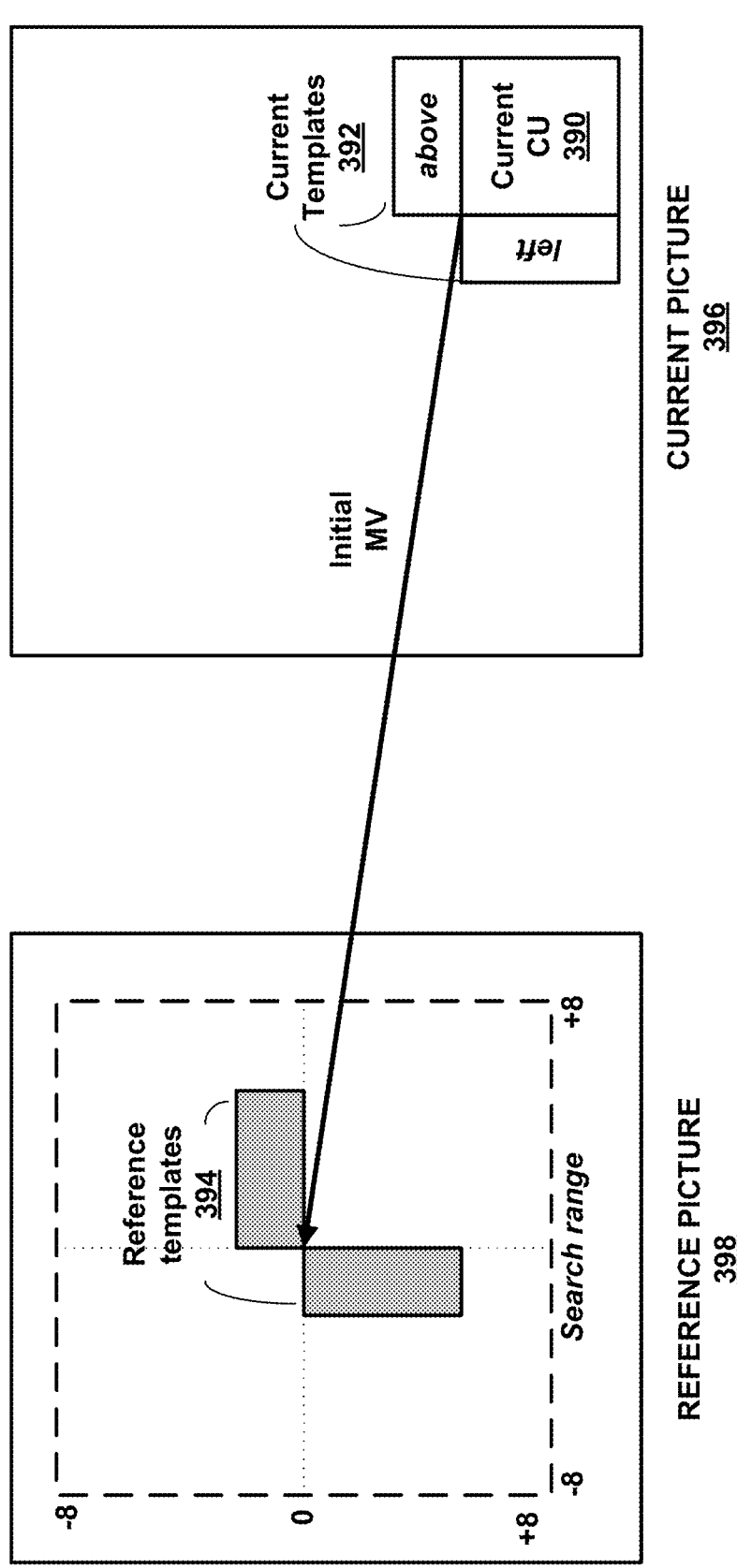
FIG. 3 is a conceptual diagram illustrating example of template matching performed on a search area around an initial motion vector (MV).

FIG. 3 is a conceptual diagram illustrating example of template matching performed on a search area around an initial motion vector (MV). Inter template matching (InterTM) is a decoder-side MV derivation technique to refine the motion information of the current CU 390 by finding the closest match between a current template 392 (e.g., top and/or left neighboring blocks of the current CU) in a current picture 396 and a block having a reference template 394 with a same size as current template 392 in a reference picture 398. As illustrated in FIG. 3, a better MV may be searched around the initial motion of current CU 390 within a [−8, +8]-pel search range. The template matching technique in Chen et al., "Description of SDR, HDR and 360° video coding technology proposal by Qualcomm and Technicolor—low and high complexity versions", Joint Video Exploration Team (JVET) of ITU-T SG 16 WP 3 and ISO/IEC JTC 1/SC 29/WG 11, 10th Meeting: San Diego, US, 10-20 Apr. 2018, document JVET-J0021 may be used with the following modifications: a search step size may be determined based on adaptive motion vector resolution (AMVR) mode and InterTM may be cascaded with a bilateral matching process in merge modes.

FIG. 4 is a tabular diagram illustrating search patterns of AMVR and merge mode with AMVR. Video encoder 200 or video decoder 300 may perform AMVR using search patterns as set forth in FIG. 4. A "✓" in a cell of FIG. 4 is indicative of the particular search pattern being supported for that mode. In AMVP mode, a motion vector predictor (MVP) candidate may be determined based on template matching error to select the MVP candidate which reaches the minimum difference between the current block template (also referred to herein as a current template) and the reference block template (also referred to herein as a reference template), and then InterTM is performed only for this particular MVP candidate for MV refinement. InterTM refines this MVP candidate, starting from full-pel motion vector difference (MVD) precision (or 4-pel for 4-pel AMVR mode) within a [−8, +8]-pel search range by using an iterative diamond search. The AMVP candidate may be further refined by using a cross search with full-pel MVD precision (or 4-pel for 4-pel AMVR mode), followed sequentially by half-pel and quarter-pel searches depending on AMVR mode as specified in Table 1, which is depicted in FIG. 4. This search process ensures that the MVP candidate retains the same MV precision as indicated by the AMVR mode after the TM process. In the search process, if the difference between the previous minimum cost and the current minimum cost in the iteration is less than a threshold that is equal to the area of the block, the search process terminates.

In merge mode, similar search techniques may be applied to the merge candidate indicated by the merge index. As Table 1 shows, InterTM may be performed all the way down to ⅛-pel MVD precision or may skip those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

The merge candidates may be adaptively reordered with template matching (TM). The reordering techniques may be applied to regular merge mode, TM merge mode, and affine merge mode (excluding the subblock-based temporal motion vector prediction (SbTMVP) candidate). For the TM merge mode, merge candidates may be reordered before the refinement process. Video encoder 200 or video decoder 300 may perform these reordering techniques.

Video encoder 200 or video decoder 300 may construct an initial merge candidate list according to a given checking order, such as spatial, temporal motion vector predictors (TMVPs), non-adjacent, HMVPs, pairwise, virtual merge candidates, or the like. Then the candidates in the initial list may be divided into several subgroups. For the template matching (TM) merge mode and/or adaptive decoder-side motion vector refinement (DMVR) mode, each merge candidate in the initial list may be firstly refined by using TM/multi-pass DMVR. Merge candidates in each subgroup may be reordered to generate a reordered merge candidate list and the reordering may be according to cost values based on template matching. The index of a selected merge candidate in the reordered merge candidate list may be signaled by video encoder 200 to video decoder 300. For simplification, merge candidates in the last but not the first subgroup may not be reordered. The zero candidates from the adaptive reordering of merge candidates (ARMC) reordering process may be excluded during the construction of merge motion vector candidates list. The subgroup size may be set to 5 for regular merge mode and TM merge mode. The subgroup size may be set to 3 for affine merge mode.

The template matching cost of a merge candidate during the reordering process may be measured by the SAD between samples of a template of the current block and their corresponding reference samples. The template includes a set of reconstructed samples neighboring the current block. Reference samples of the template are located by the motion information of the merge candidate. When a merge candidate utilizes bi-directional prediction, the reference samples of the template of the merge candidate are also generated by bi-prediction as shown in FIG. 5.

Figure 5:
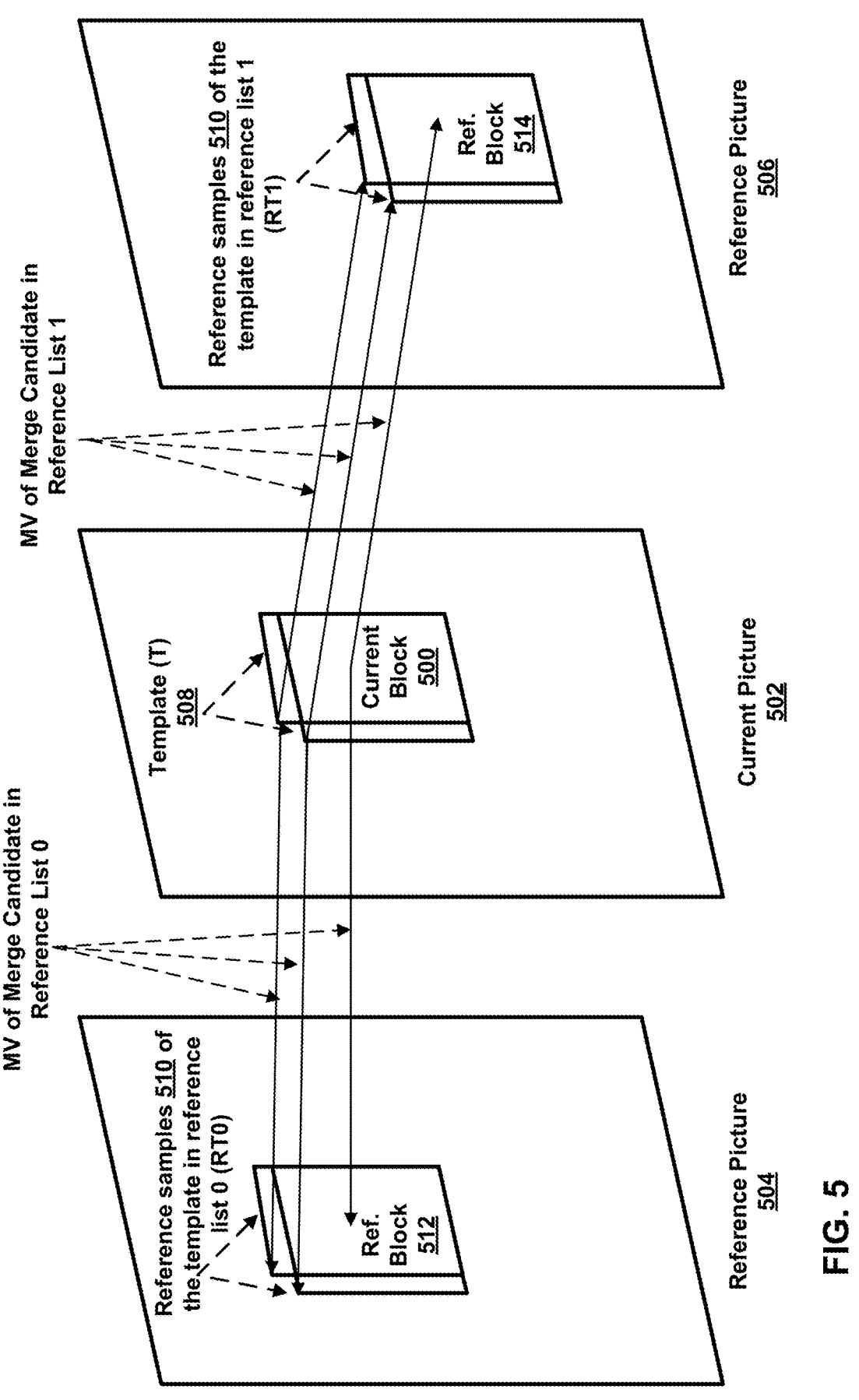
FIG. 5 is a conceptual diagram illustrating example template and reference samples of the template in reference pictures.
Figures 8A, 8B, 8C, 8D:
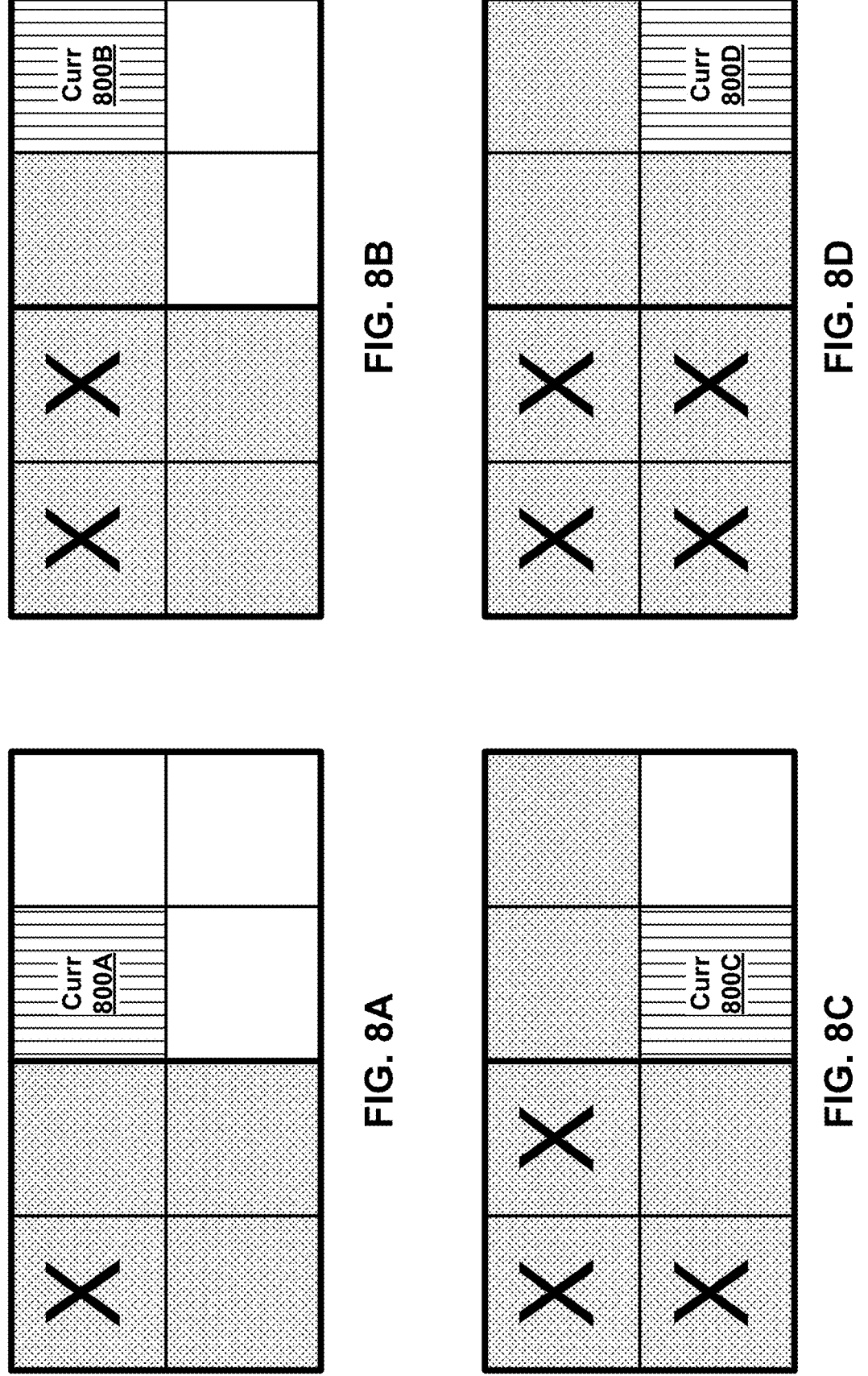
FIGS. 8A-8D are conceptual diagrams illustrating example intra block copy (IBC) reference regions depending on current CU position.

FIG. 5 is a conceptual diagram illustrating example template and reference samples of the template in reference pictures. As shown in the example of FIG. 5, a video coder (e.g., video encoder 200 or video decoder 300) is coding (e.g., encoding or decoding) a current block 500 of a current picture 502. Current block 500 is associated with a merge candidate list that includes one or more bi-prediction merge candidates. Each of the bi-prediction merge candidates includes a List 0 motion vector and a List 1 motion vector. The List 0 motion vector indicates a location within a reference picture in a first reference picture list (e.g., list 0). The List 1 motion vector indicates a location within a reference picture in a second reference picture list (e.g., list 1). In the example of FIG. 5, the List 0 motion vector of a selected merge candidate indicates a location in a reference picture 504. The List 1 motion vector of a selected merge candidate indicates a location in a reference picture 506. Video encoder 200 or video decoder 300 may then use a template 508 of current block 500 to search areas near indicated locations in reference picture 504 and reference picture 506 for templates 510 (i.e., reference samples of a template in reference list 0 and reference list 1). In this way, video encoder 200 or video decoder 300 may be able to identify a reference block 512 and a reference block 514 that are potentially more similar to current block 500 than reference blocks at locations indicated by the List 0 motion vector and the List 1 motion vector.

When multi-pass DMVR is used to derive the refined motion to the initial merge candidate list, only the first pass (e.g., PU level) of multi-pass DMVR may be applied in reordering. When template matching is used to derive the refined motion, the template size may be set equal to 1. In some examples, only the above or left template may be used during the motion refinement of TM when the block is flat with block width greater than 2 times of height or narrow with height greater than 2 times of width. TM may be extended to perform 1/16-pel MVD precision. The first four merge candidates may be reordered with the refined motion in TM merge mode.

FIG. 6 is a conceptual diagram illustrating example template and reference samples for a block with subblock motion using the motion information of the subblocks of the current block. For subblock-based merge candidates with a subblock size equal to Wsub×Hsub, the above template includes several sub-templates 602 (which together may constitute the above reference template) with the size of Wsub×1, and the left template includes several sub-templates 604 (which together may constitute the left reference template) with the size of 1×Hsub. As shown in FIG. 6, the motion information of the subblocks in the first row and the first column (sub-blocks A-G) of current block 606 is used to derive the reference samples of each sub-template.

In the reordering process, video encoder 200 or video decoder 300 may consider a candidate as redundant if the cost difference between a candidate and its predecessor is inferior to (e.g., less than) a lambda ($\lambda$) value, e.g., $|1-D2|<\lambda$, where D1 and D2 are the costs obtained during the first ARMC ordering and A is the Lagrangian parameter used in the rate distortion (RD) criterion at video encoder 200.

For example, video encoder 200 or video decoder 300 may execute an algorithm for the reordering process that may function as follows: Determine the minimum cost difference between a candidate and its predecessor among all candidates in the list. If the minimum cost difference is superior or equal to (e.g., greater or equal to) $\lambda$, the list is considered diverse enough and the reordering stops. If this minimum cost difference is inferior to (e.g., less than) $\lambda$, the candidate is considered as redundant and the candidate is moved at a further position in the list. This further position is the first position where the candidate is diverse enough compared to its predecessor. The algorithm may stop after a finite number of iterations (if the minimum cost difference is not inferior to $\lambda$).

This algorithm may be applied to the Regular, TM, BM and Affine merge modes. A similar algorithm may be applied to the merge mode with motion vector difference (MMVD) and sign MVD prediction methods which also use ARMC for the reordering.

The value of $\lambda$ may be set equal to the $\lambda$ of the rate distortion criterion used to select the best merge candidate at video encoder 200 for low delay configuration and to the value $\lambda$ corresponding to a another quantization parameter (QP) for Random Access configuration. A set of $\lambda$ values corresponding to each signaled QP offset may be provided in the SPS or in the Slice Header for the QP offsets which are not present in the SPS.

The ARMC design is also applicable to the AMVP mode, wherein the AMVP candidates are reordered according to the TM cost. For the template matching for advanced motion vector prediction (TM-AMVP) mode, an initial AMVP candidate list may be constructed, followed by a refinement from TM to construct a refined AMVP candidate list. In addition, an MVP candidate with a TM cost larger than a threshold, which is equal to five times of the cost of the first MVP candidate, may be skipped.

Note, when wrap around motion compensation is enabled, the MV candidate may be clipped with a wraparound offset taken into consideration.

FIG. 7 is a tabular diagram illustrating template for the 1st and 2nd geometric partitions, where A represents using above samples, L represents using left samples, and L+A represents using both left and above samples.

Video encoder 200 or video decoder 300 may apply template matching to geometric partitioning mode (GPM). When GPM mode is enabled for a CU, video encoder 200 may signal a CU-level flag to indicate whether TM is applied to both geometric partitions. Motion information for each geometric partition may be refined using TM. When TM is chosen, a template may be constructed using left, above, or left and above neighboring samples according to partition angle, as shown in Table 2 of FIG. 7. The motion may then be refined by minimizing the difference between the current template and the template in the reference picture using the same search pattern of merge mode with half-pel interpolation filter disabled.

A GPM candidate list may be constructed as follows: Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates. Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates. Zero MV candidates are padded until the GPM candidate list is full.

The geometric portioning mode—merge mode with motion vector difference (GPM-MMVD) and geometric portioning mode—template matching (GPM-TM) may be exclusively enabled to one GPM CU. This may be accomplished by firstly signaling the GPM-MMVD syntax. For example, video encoder 200 may signal the GPM-MMVD syntax. When both of the two GPM-MMVD control flags are equal to false (e.g., the GPM-MMVD are disabled for two GPM partitions), the GPM-TM flag may be signaled to indicate whether the template matching is applied to the two GPM partitions. For example, video encoder 200 may signal the GPM-TM flag. Otherwise (at least one GPM-MMVD flag is equal to true), the value of the GPM-TM flag may be inferred to be false. For example, if the GPM-TM flag is not signaled, video decoder 300 may infer the GPM-TM flag to be false.

Video encoder 200 or video decoder 300 may use Template Matching in intra block copy (IBC) for both intra block copy (IBC) merge mode and IBC AMVP mode. The IBC-TM merge list may be modified compared to the one used by regular IBC merge mode such that the candidates are selected according to a pruning technique with a motion distance between the candidates as in the regular TM merge mode. The ending zero motion fulfillment may be replaced by motion vectors to the left (−W, 0), top (0,−H) and top-left (−W,−H), where W is the width and H the height of the current CU.

In the intra block copy—template matching (IBC-TM) merge mode, the selected candidates may be refined with the template matching technique prior to the rate distortion optimization (RDO) or decoding process. For example, video encoder 200 or video decoder 300 may refine the selected candidates. The IBC-TM merge mode may be placed in competition with the regular IBC merge mode and a TM-merge flag may be signaled.

In the IBC-TM AMVP mode, up to 3 candidates may be selected from the IBC-TM merge list. Each of those 3 selected candidates may be refined using the template matching technique and sorted according to their resulting template matching cost. Only the 2 first candidates may then be considered in the motion estimation process as usual.

FIGS. 8A-8D are conceptual diagram illustrating example IBC reference regions depending on a current coding unit (CU) position. In FIGS. 8A-8D, shaded blocks are "causal" with respect to a current block 800A, 800B, 800C, or 800D (collectively, "current blocks 800"). In other words, the shaded blocks are encoded or decoded prior to current blocks 800. Blocks marked with an "X" mark are reference regions that can be used with respect to current blocks 800 for IBC-TM. The Template Matching refinement for both IBC-TM merge and AMVP modes is quite simple since IBC motion vectors are constrained (i) to be integer and (ii) within a reference region as shown in FIGS. 8A-8D. So, in IBC-TM merge mode, all refinements are performed at integer precision, and in IBC-TM AMVP mode, they are performed either at integer or 4-pel precision depending on the AMVR value. Such a refinement accesses only samples without interpolation. In both cases, the refined motion vectors and the used template in each refinement step may (and in some examples, must) respect the constraint of the reference region.

To improve the coding efficiency of template matching and/or the quality of encoded video data, instead of using only one pattern and process of template matching, template matching according to the techniques of this disclosure may include the use of different template types, storing more candidates, and/or applying fusion to combine these different candidates which are found by the different template matching techniques.

Current search algorithms may have excessive limitations to the search area close to a picture boundary and to the reconstructed area boundary which may limit potential reference blocks and thereby potential MV candidates for some video content. The techniques of this disclosure expand potential choices by addressing issues with search areas close to picture boundaries and to reconstructed area boundaries.

For example, a current search algorithm may test an above-left part, then test a left part, then test an above part, to determine the availability of each such part. If the current search algorithm finds that the above-left part is unavailable, for example because the above-left part may cross a picture boundary or a reconstructed area boundary, the algorithm may terminate that search and thereby rule out a potential reference block or may move on to check the above part, without checking the left part. However, there are instances where an above-left part may be unavailable, while a left part may be available, or an above part may be available. The techniques of this disclosure include considering blocks having such templates as potential reference blocks. While such techniques may be more computationally expensive, as more potential reference blocks may be checked, these techniques may lead to a better reference block for predicting the motion of a current block and thereby increase coding quality and/or coding efficiency in the end.

For simplicity purposes, TM discussed hereinafter may refer to the intra template matching, inter template matching, adaptive reordering of merge candidates with template matching (ARMC-TM), and/or IBC template matching. The disclosed techniques can be used alone or in any combination.

FIG. 9 is a conceptual diagram illustrating example template parts. For example, a current block 900 may have a template including above part 904, above-left part 902, and/or left part 906. Above part 904 may be a template or portion thereof that is directly above current block 900. Left part 906 may be a template or portion thereof that is directly left of current block 900. Current block 900 may have a height of H and a width of W. Above part 904 may have a height of T and left part 906 may have a width of T. Above-left part may be directly left of above part 904 and directly above left part 906 and have a height of T and a width of T. As such, above-left part 902 may be said to be both above and left of current block 900.

In some examples, the template parts availability is determined based on availability of neighbor blocks. For example, video encoder 200 or video decoder 300 may determine which template parts (above part, left part, and/or above-left part) are available based on neighbor blocks' availability.

For example, a left template part (e.g., left part 906) is used when all the adjacent CUs to the left of the current block are available. For example, video encoder 200 or video decoder 300 may use left part 906 when all the adjacent CUs to the left of current block 900 are available. In one example, at least one block adjacent to the top picture boundary, but not adjacent to the left picture boundary has the left template part. In such an example, video encoder 200 or video decoder 300 may use left part 906. In an example existing design, the left template part for this block is treated as unavailable.

For example, an above template part (e.g., above part 904) is used when all the adjacent CUs above the current block are available. For example, video encoder 200 or video decoder 300 may use above part 904 when all the adjacent CUs above current block 900 are available. In one example, at least one block adjacent to the left picture boundary, but not adjacent to the top picture boundary, has the above template part. In such an example, video encoder 200 or video decoder 300 may use above part 904.

For example, an above-left template part (e.g., above-left part 902) is used when the neighboring CU left-above the current block is available. For example, video encoder 200 or video decoder 300 may use above-left part 902 when the neighboring CU left-above current block 900 is available.

In a similar manner, the templates may be extended to include above-right and/or below-left parts when such part(s) are available. For example, video encoder 200 or video decoder 300 may extend a template to include an above-right part and/or a below-left part. An above-right part would include samples to the right of above part 904. A below-left part would include samples below left part 906. For example, left part 906 may be extended downward (e.g., towards the bottom of a picture) if CUs below-left current block 900 are available. Such a left part may be referred to as an extended left part. In one example, at least one block not adjacent to picture boundaries has a template including an extended left part.

For example, above part 904 may be extended to the right if CUs above-right current block 900 are available. Such an above part may be referred to as an extended above part. In one example, at least one block not adjacent to picture boundaries has a template including an extended above part.

When no template part is available, TM may not be applied.

Reference block search area for TM is now discussed. To address picture boundary handling, in an example, in the template matching search process, the reference block may be (e.g., should be) located in the predefined search range within the picture. For example, the use of a reference block outside of or partially outside of the predefined search range within the picture may be penalized or prohibited. Additionally, a constraint may be imposed that the refence block or reference block including its templates may be (e.g., should be or must be) completely located inside the picture. For example, video encoder 200 or video decoder 300 may perform template matching with the reference block located in the predefined search range within the picture. In some examples, video encoder 200 or video decoder 300 may perform template matching with potential reference blocks if the potential reference block and the template of the potential reference block are both entirely located inside the picture (e.g., do not cross a picture boundary).

Figure 10A:
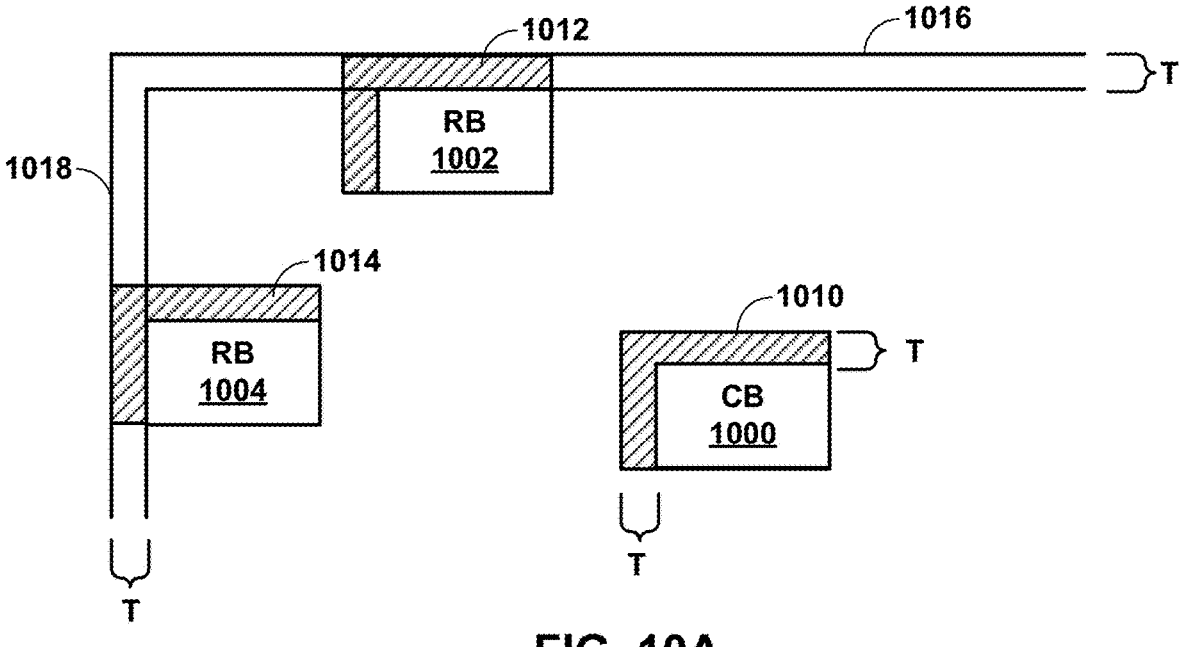
FIGS. 10A-10C are conceptual diagrams illustrating examples of picture boundary handling dependent on template type.
Figure 10B:
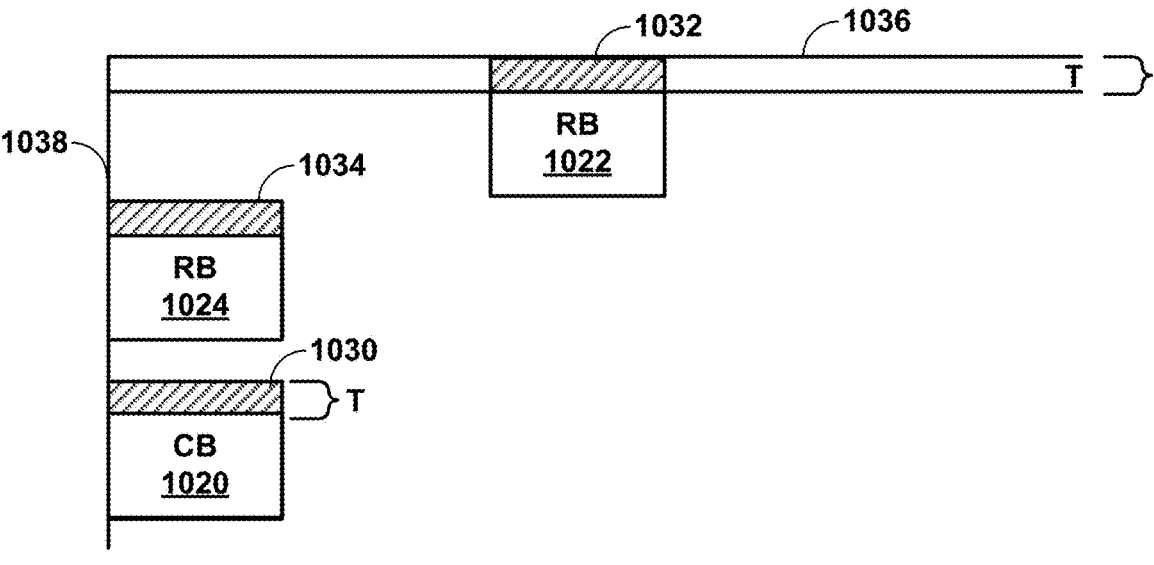
Figure 10C:
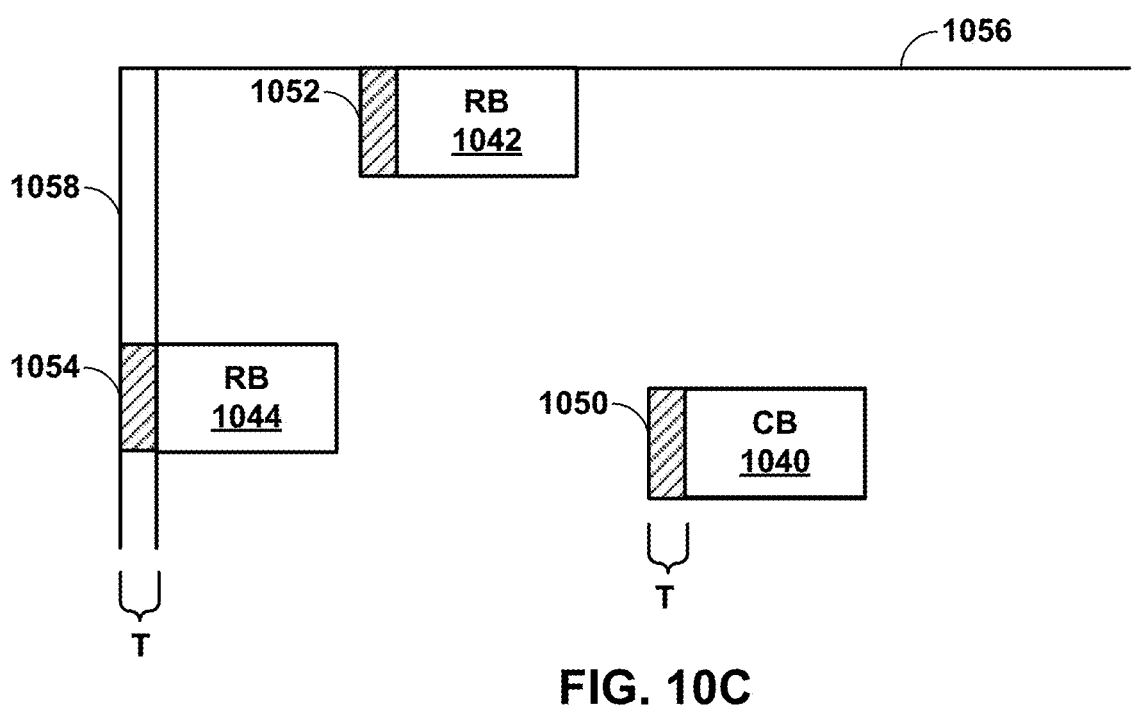

FIGS. 10A-10C are conceptual diagrams illustrating examples of picture boundary handling dependent on template type. In FIG. 10A, current block 1000 has an L-shaped template 1010 including above, left, and above-left parts. Similarly, reference blocks 1002 and 1004 have L-shaped templates 1012 and 1014, respectively. In FIG. 10B, current block 1020 has an above-shaped template 1030 including an above part. Similarly, reference blocks 1022 and 1024 have above-shaped templates 1032 and 1034, respectively. In FIG. 10C, current block 1040 has a left-shaped template 1050 including a left part. Similarly, reference blocks 1042 and 1044 have left-shaped templates 1052 and 1054, respectively.

In one example, when the template shape includes left, above-left, and above template parts (e.g., as in FIG. 10A), or at least two of such parts, the top-left sample of the reference block may (e.g., should) have an offset of at least T both vertically and horizontally from the picture boundary (which may, in some examples, be referred to as a picture border), where T represents the template size. For example, in FIG. 10A, reference block 1002 has a vertical offset of T from the top picture boundary 1016 and a horizontal offset larger than T from left picture boundary 1018. Reference block 1004 has a vertical offset larger than T from top picture boundary 1016 and a horizontal offset of T from left picture boundary 1018. Both reference block 1002 and reference block 1004 would be available as potential reference blocks for current block 1000.

In one example, when the template shape includes only above template part (as in FIG. 10B), the top-left sample of the reference block may (e.g., should) have an offset of at least T only vertically from the picture boundary (e.g., top picture boundary 1036). In one example, at least one searched reference block is adjacent to the left picture boundary (e.g., left picture boundary 1038), but not adjacent to the top picture boundary (e.g., top picture boundary 1036), while in an example existing design this reference block is excluded from the search area. For example, in FIG. 10B, both reference block 1022 and reference block 1024 have a vertical offset of at least T from top picture boundary 1036. As such, both reference block 1022 and reference block 1024 would be available as potential reference blocks for current block 1020.

In one example, when the template shape includes only a left template part (as shown in FIG. 10C), the top-left sample of the reference block may (e.g., should) have an offset of at least T horizontally from the picture boundary (e.g., left picture boundary 1058). In one example, at least one searched reference block (e.g., reference block 1042) is adjacent to the top picture boundary (e.g., top picture boundary 1056), but not adjacent to the left picture boundary (e.g., left picture boundary 1058), while in an example existing design this reference block is excluded from the search area. For example, in FIG. 10C, both reference block 1042 and reference block 1044 have a horizontal offset of at least T from left picture boundary 1058. As such, both reference block 1042 and reference block 1044 would be available as potential reference blocks for current block 1040.

Figure 11:
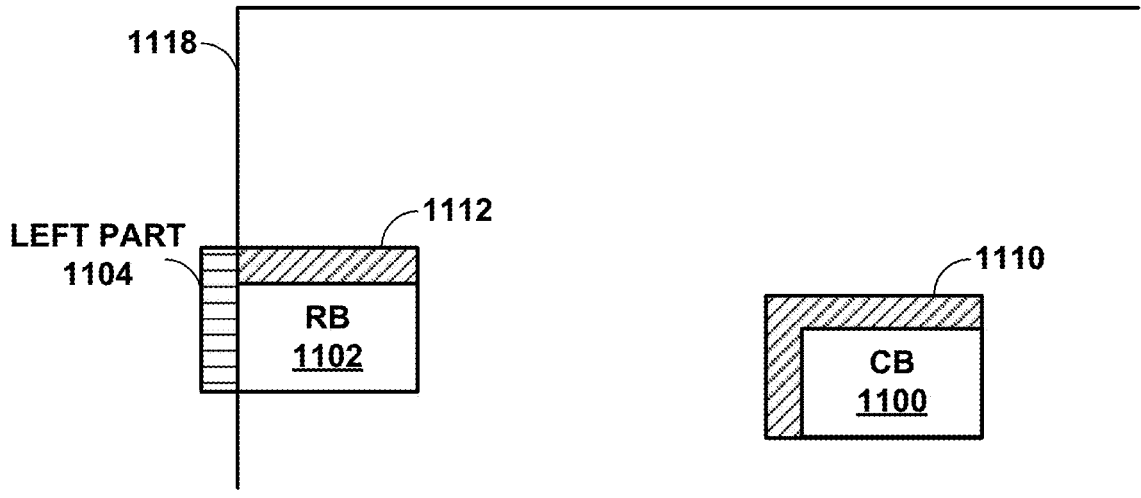
FIG. 11 is a conceptual diagram illustrating an alternative example picture boundary handling for an example of an L-shape.

FIG. 11 is a conceptual diagram illustrating an alternative example picture boundary handling for an example of an L-shaped template. In the example of FIG. 11, current block 1100 has an L-shaped template 1110 including an above part, a left part, and an above-left part. Reference block 1102 has L-shaped template 1112. L-shaped template 1112 may include unavailable samples of left part 1104 that are on the other side of a left picture boundary (e.g., left picture boundary 1118).

In another example, only the reference block without its template may (e.g., should) be located inside the picture. In other words, if the template (or portions thereof) of the reference block is located outside of the picture, video encoder 200 or video decoder 300 may still use such a reference block. In this case, video encoder 200 or video decoder 300 may derive the unavailable template parts by padding left part 1104 using available samples as shown in FIG. 11. In one example, the reference block having L-shape template may be adjacent to the left or top picture boundary, while an example existing design excludes this block from the search area.

Reconstructed area boundary handling is now discussed. In an example existing design, reference blocks having samples in the current CTU below or to the right of the bottom-right (which may also be referred to as below-right) sample of the current block are excluded from the search area.

Video encoder 200 or video decoder 300 may determine a search region. For example, the search region may be determined from the block decoding order, if a neighboring area is already decoded then such an area may be used for the search. In one example, all blocks whole or partially located inside the current CTU and belonging completely to the reconstructed area are included in the search area. In one example, in the disclosed technique the bottom-left (which may also be referred to as below-left) reconstructed area relative to the current block and above-right reconstructed area relative to the current block may be included in the search area (e.g., if these areas are already reconstructed based on the coding order), while such areas are excluded from the search in a current example intra template matching design.

Refinement of the search is now discussed. In an example existing design, the TM search is multistep process: at the first stage the search is conducted in a compound area including regions R1, R2, R3, R4 as shown in FIG. 2. The reference block vertical and horizontal offsets are restricted by absolute value to predefined thresholds. A subsampling search is applied at the first step by choosing a search step size larger than 1, and a best block vector (BV) minimizing the searching cost is identified. At the subsequent stage, the search area is restricted to one best region from the set R1, R2, R3, R4 to which the best BV obtained in the subsampled search is pointing. At the next step, the refined search with step size of 1 sample is performed around the best BV in a predefined neighborhood. However, the neighborhood is restricted to be located in the best region, so when the neighborhood is crossing a region boundary (e.g., between R2 and R3), the positions of the neighborhood located in the other region are not checked, which is suboptimal, especially for the cases when the best BV points to the samples near the region boundary.

In an example, the refinement stage search area is not restricted to be performed within only one of the regions R1, R2, R3, R4, but instead may be performed using a combination of regions R1, R2, R3, R4. For example, video encoder 200 or video decoder 300 may perform a template matching refinement search in a plurality of regions. In one example, the restriction on the neighborhood to be inside only one of the regions is removed.

In one example, the finally determined best match has the lowest template cost in a predefined region being a rectangle [x−dx1, x+dx2]*[y−dy1, y+dy2] where samples (x−dx1,y) and (x+dx2,y) may belong to different search regions, while in an example existing design, those samples have to be from the single search range. In one example, video encoder 200 or video decoder 300 may determine a list of matches ordered by template matching cost based on samples in a plurality of search regions.

Unavailable reference block samples and padding for TM is now discussed. Video encoder 200 or video decoder 300 may utilize the padding techniques for TM described herein.

Figure 12:
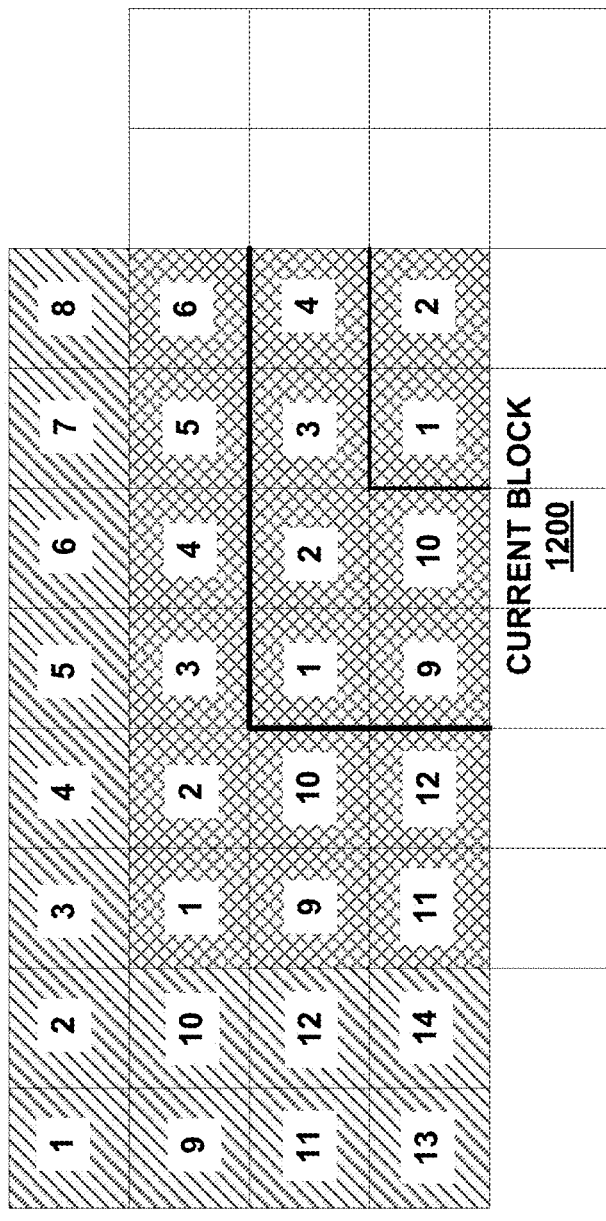
FIG. 12 is a conceptual diagram illustrating example padding of the unavailable samples by copying values from the available samples.

FIG. 12 is a conceptual diagram illustrating example padding of the unavailable samples by copying values from the available samples. In one example, the reference block samples which are unavailable due to a location of current block 1200 (e.g., in one example, the reference block is overlapped with the current block) are derived recursively by copying samples from the positions in the reference block corresponding to their positions in the current block as shown in the FIG. 12, where each sample is represented by a number, and a sample with the same number in the hashed patterned unreconstructed area of the current block is copied from the already reconstructed sample (represented with diagonal patterns) having the same sample number. For example, video encoder 200 or video decoder 300 may perform such padding.

Having the block vector (BVx, BVy) and the current position (x, y) in the reference block, the unavailable value is copied from the position (x-BVx, y-BVy). In case the referenced position is located in current block 1200, the unavailable value is derived in the same way: (x−2*BVx, y−2*BVy) etc.

In another example, other padding techniques may be applied, for example copying the nearest available samples, or any other padding technique may be used. In another example, the unavailable samples of a reference block located outside the picture boundaries may be derived using any technique of picture boundary padding.

FIG. 13 is a flowchart illustrating example template matching techniques according to one or more aspects of this disclosure. Video encoder 200 or video decoder 300 may determine a current template of a current block in a picture of the video data (1300). For example, video encoder 200 or video decoder 300 may generate a current template for the current block based on the availability of adjacent blocks.

Video encoder 200 or video decoder 300 may determine a potential reference block in the picture for the current block (1302). For example, video encoder 200 or video decoder 300 may determine which blocks are available within a search range to determine one or more potential reference blocks.

Video encoder 200 or video decoder 300 may determine that the potential reference block and a reference template of the potential reference block are entirely within the picture, the reference template having a same shape as the current template (1304). For example, video encoder 200 or video decoder 300 may determine a reference template for the reference block that matches the shape of the current template. Video encoder 200 or video decoder 300 may determine that the potential reference block and the reference template of the potential reference block are entirely within the picture. A potential reference block may be entirely within the picture if all samples of a type (e.g., all luma samples) of the potential reference block are within the picture. A reference template may be entirely within the picture if all samples of the type (e.g., all luma samples) of the reference template are within the picture. For example, video encoder 200 or video decoder 300 may determine that neither the potential reference block nor the reference template cross any picture boundary.

Based on the potential reference block and the reference template both being entirely within the picture, video encoder 200 or video decoder 300 may perform template matching between the reference template and the current template (1306). For example, video encoder 200 or video decoder 300 may perform template matching by calculating a template matching cost associated with the reference template.

Video encoder 200 or video decoder 300 may code the current block based on the template matching (1308). For example, video encoder 200 or video decoder 300 may code the current block using a potential reference block having a lowest template matching cost as the reference block for the current block when encoding or decoding the current block. In another example, video encoder 200 or video decoder 300 may build a list of potential reference blocks ordered using template matching cost, and the index of the reference block used for coding the current block in the list may be signaled. In another example, video encoder 200 or video decoder 300 may use a plurality of reference blocks from the list when encoding or decoding the current block.

In some examples, the potential reference block is a first potential reference block and wherein the reference template is a first reference template. In some examples, video encoder 200 or video decoder 300 may determine that at least one of a second potential reference block or a second reference template of the second potential reference block is not entirely within the picture. In some examples, video encoder 200 or video decoder 300 may, based on the at least one of the second potential reference block or a second reference template not being entirely within the picture, not perform template matching between the second reference template and a current template of a current block of the video data. In some examples, video encoder 200 or video decoder 300 may code the current block using a reference block other than the second potential reference block. For example, based on either of, or both of, the second potential reference block or the second reference template crossing one or more picture boundaries, video encoder 200 or video decoder 300 may exclude the second potential reference block from being the reference block for the current block.

In some examples, the reference template includes at least two of a left part, an above-left part, or an above part. In some examples, a top-left sample of the potential reference block is offset in a vertical direction by a width of at least one of the above-left part or the above part from a top picture boundary, and offset in a horizontal direction by at least a width of at least one of the left part or the above-left part from a left picture boundary.

In some examples, the reference template includes only a left part. In some examples, a top-left sample of the potential reference block is offset in a horizontal direction by a width of the left part from a left picture boundary. In some examples, the potential reference block is adjacent to a top picture boundary, but not adjacent to the left picture boundary.

In some examples, the reference template includes only an above part. In some examples, a top-left sample of the potential reference block is offset in a vertical direction by a width of the above part from a top picture boundary. In some examples, the potential reference block is adjacent to a left picture boundary, but not adjacent to a top picture boundary.

In some examples, the potential reference block is one of a plurality of potential reference blocks. In some examples, video encoder 200 or video decoder 300 may determine a search region of the picture for the plurality of potential reference blocks to include all blocks wholly or partially located inside a current coding tree unit (CTU) of the video data that are completely reconstructed. In some examples, video encoder 200 or video decoder 300 may determine that the potential reference block is within the search region.

In some examples, the search region includes one search region of a plurality of search regions. In some examples, video encoder 200 or video decoder 300 may perform a refinement template matching search on results of the template matching search. In some examples, the refinement template matching search includes searching in the plurality of search regions.

In some examples, the current template includes at least one part. In some examples, as part of determining the current template, video encoder 200 or video decoder 300 may determine the at least one part based on availability of adjacent blocks to the current block.

In some examples, the at least one part includes a left part. In some examples, as part of determining the at least one part, video encoder 200 or video decoder 300 may determine that all adjacent blocks left of the current block are available. In some examples, the current block includes a block adjacent to a top picture boundary, but not adjacent to a left picture boundary.

In some examples, the at least one part includes an above part. In some examples, as part of determining the at least one part, video encoder 200 or video decoder 300 may determine that all adjacent blocks above the current block are available. In some examples, the current block includes a block not adjacent to a top picture boundary, but adjacent to a left picture boundary.

In some examples, the at least one part includes an above-left part. In some examples, as part of determining the at least one part, video encoder 200 or video decoder 300 may determine that a neighboring block left and above the current block is available.

In some examples, video encoder 200 or video decoder 300 may determine that neighboring blocks left and below the current block are available. In some examples, based on neighboring blocks left and below the current block being available, video encoder 200 or video decoder 300 may extend a left part downward so that a bottom of the left part is lower in a vertical direction than a bottom of the current block.

In some examples, video encoder 200 or video decoder 300 may determine that neighboring blocks above and right of the current block are available. In some examples, based on neighboring blocks above and right of the current block being available, video encoder 200 or video decoder 300 may extend an above part to rightward so that a right edge of the above part is further right in a horizontal direction than a right edge of the current block.

In some examples, coding includes decoding. In some examples, coding includes encoding.

Figure 14:
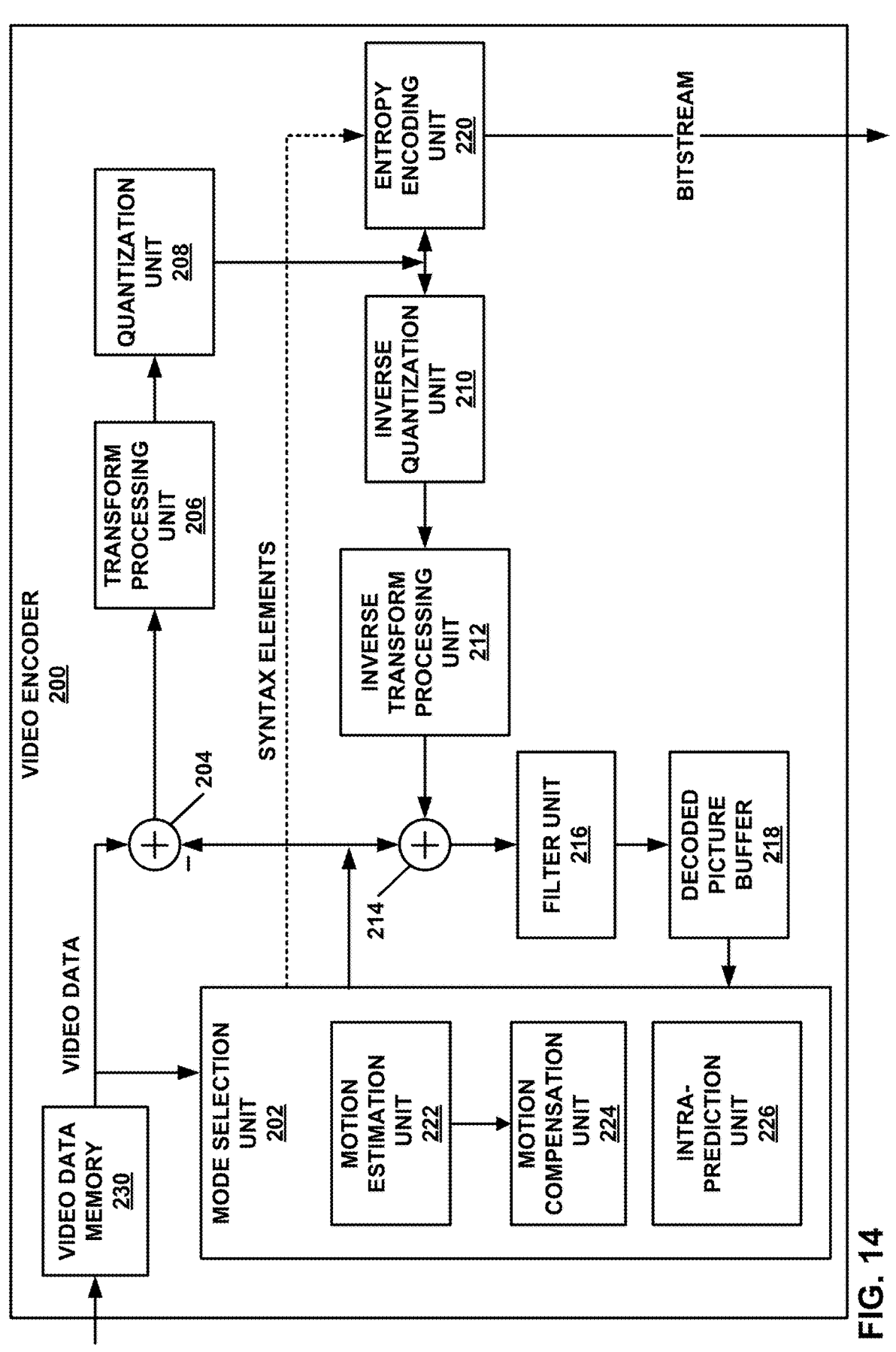
FIG. 14 is a block diagram illustrating an example video encoder that may perform the techniques of this disclosure.

FIG. 14 is a block diagram illustrating an example video encoder 200 that may perform the techniques of this disclosure. FIG. 14 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 14, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 14 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUS, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes. Mode selection unit 202 (e.g., motion estimation unit 222, motion compensation unit 224, and/or intra-prediction unit 226) may perform the template matching techniques of FIG. 13.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including one or more memories configured to store the video data; and one or more processors, implemented in circuitry and communicatively coupled to the one or more memories, the one or more processors being configured to: determine a current template of a current block of the video data; determine a potential reference block in a picture of the video data for the current block; determine that the potential reference block and a reference template of the potential reference block are entirely within the picture, the reference template having a same shape as the current template; based on the potential reference block and the reference template both being entirely within the picture, perform template matching between the reference template and the current template; and encode the current block based on the template matching.

Video encoder 200 also represents an example of a device configured to encode video data including a memory configured to store video data, and one or more processing units implemented in circuitry and configured to determine at least one part of a template based on availability of neighboring blocks of the video data, the neighboring blocks neighboring a current block of the video data; perform template matching based on the template; and encode the current block based on the template matching.

Video encoder 200 also represents an example of a device configured to encode video data including a memory configured to store video data, and one or more processing units implemented in circuitry and configured to: determine a search range; determine that a reference block of the video data is entirely within the search range; based on the reference block being entirely within the search range, perform template matching between the reference block and a current block of the video data; and encode the current block based on the template matching.

Video encoder 200 also represents an example of a device configured to encode video data including a memory configured to store video data, and one or more processing units implemented in circuitry and configured to: determine a search region based on areas that are already decoded; perform template matching based on the search region; and encode a current block of the video data based on the template matching.

Video encoder 200 also represents an example of a device configured to encode video data including a memory configured to store video data, and one or more processing units implemented in circuitry and configured to: perform a template matching search; perform a refinement template matching search on results of the template matching search, wherein the refinement template matching search comprises searching in a plurality of search regions; and encode a current block of the video data based on the refinement template matching search.

Video encoder 200 also represents an example of a device configured to encode video data including a memory configured to store video data, and one or more processing units implemented in circuitry and configured to: determine that samples of a reference block of the video data are unavailable; based on samples of the reference block being unavailable, copy samples from respective corresponding positions in a current block of the video data; and encode the current block based on the reference block.

Figure 15:
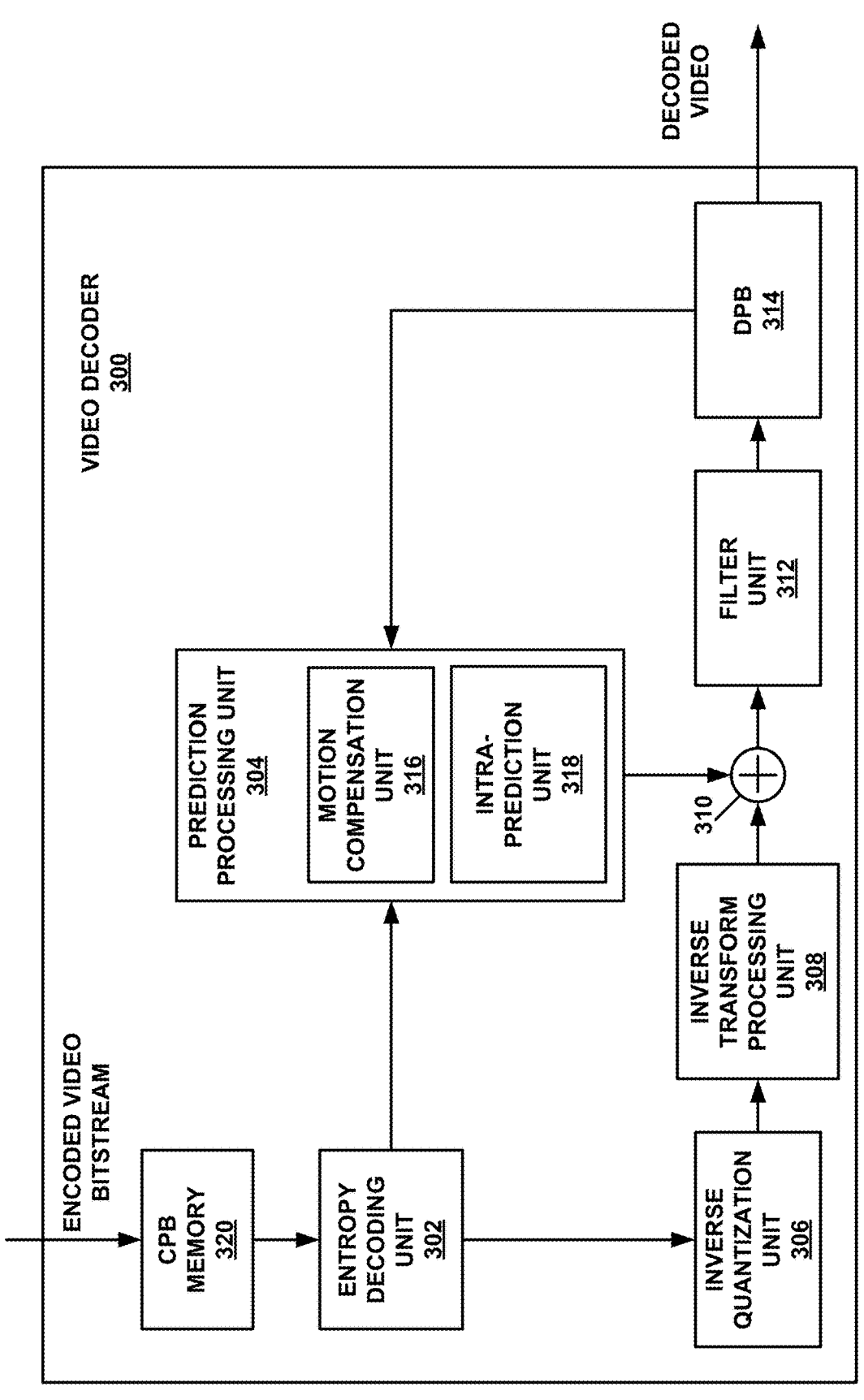
FIG. 15 is a block diagram illustrating an example video decoder that may perform the techniques of this disclosure.

FIG. 15 is a block diagram illustrating an example video decoder 300 that may perform the techniques of this disclosure. FIG. 15 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 15, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components. Prediction processing unit 304 (e.g., motion compensation unit 316 and/or intra-prediction unit 318) may perform the template matching techniques of FIG. 13.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 15 are illustrated to assist with understanding the operations performed by video decoder 300. The units may be implemented as fixed-function circuits, programmable circuits, or a combination thereof. Similar to FIG. 14, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 14).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 14). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example video decoding device including one or more memories configured to store the video data; and one or more processors, implemented in circuitry and communicatively coupled to the one or more memories, the one or more processors being configured to: determine a current template of a current block of the video data; determine a potential reference block in a picture of the video data for the current block; determine that the potential reference block and a reference template of the potential reference block are entirely within the picture, the reference template having a same shape as the current template; based on the potential reference block and the reference template both being entirely within the picture, perform template matching between the reference template and the current template; and decode the current block based on the template matching.

Video decoder 300 also represents an example of a video decoding device including a memory configured to store video data, and one or more processing units implemented in circuitry and configured to: determine at least one part of a template based on availability of neighboring blocks of the video data, the neighboring blocks neighboring a current block of the video data; perform template matching based on the template; and decode the current block based on the template matching.

Video decoder 300 also represents an example of a device configured to decode video data including a memory configured to store video data, and one or more processing units implemented in circuitry and configured to: determine a search range; determine that a reference block of the video data is entirely within the search range; based on the reference block being entirely within the search range, perform template matching between the reference block and a current block of the video data; and decode the current block based on the template matching.

Video decoder 300 also represents an example of a device configured to decode video data including a memory configured to store video data, and one or more processing units implemented in circuitry and configured to: determine a search region based on areas that are already decoded; perform template matching based on the search region; and decode a current block of the video data based on the template matching.

Video decoder 300 also represents an example of a device configured to decode video data including a memory configured to store video data, and one or more processing units implemented in circuitry and configured to: perform a template matching search; perform a refinement template matching search on results of the template matching search, wherein the refinement template matching search comprises searching in a plurality of search regions; and decode a current block of the video data based on the refinement template matching search.

Video decoder 300 also represents an example of a device configured to decode video data including a memory configured to store video data, and one or more processing units implemented in circuitry and configured to: determine that samples of a reference block of the video data are unavailable; based on samples of the reference block being unavailable, copy samples from respective corresponding positions in a current block of the video data; and decode the current block based on the reference block.

Figure 16:
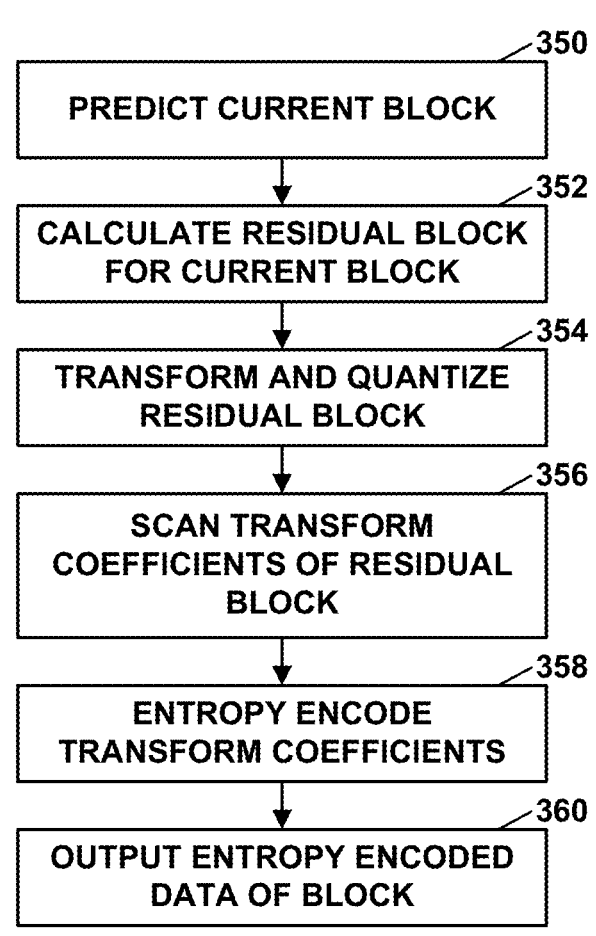
FIG. 16 is a flowchart illustrating an example method for encoding a current block in accordance with the techniques of this disclosure.

FIG. 16 is a flowchart illustrating an example method for encoding a current block in accordance with the techniques of this disclosure. The current block may be or include a current CU. Although described with respect to video encoder 200 (FIGS. 1 and 14), it should be understood that other devices may be configured to perform a method similar to that of FIG. 16.

In this example, video encoder 200 initially predicts the current block (350). For example, video encoder 200 may form a prediction block for the current block. When forming the prediction block for the current block, video encoder 200 may perform the template matching techniques of FIG. 13. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 17:
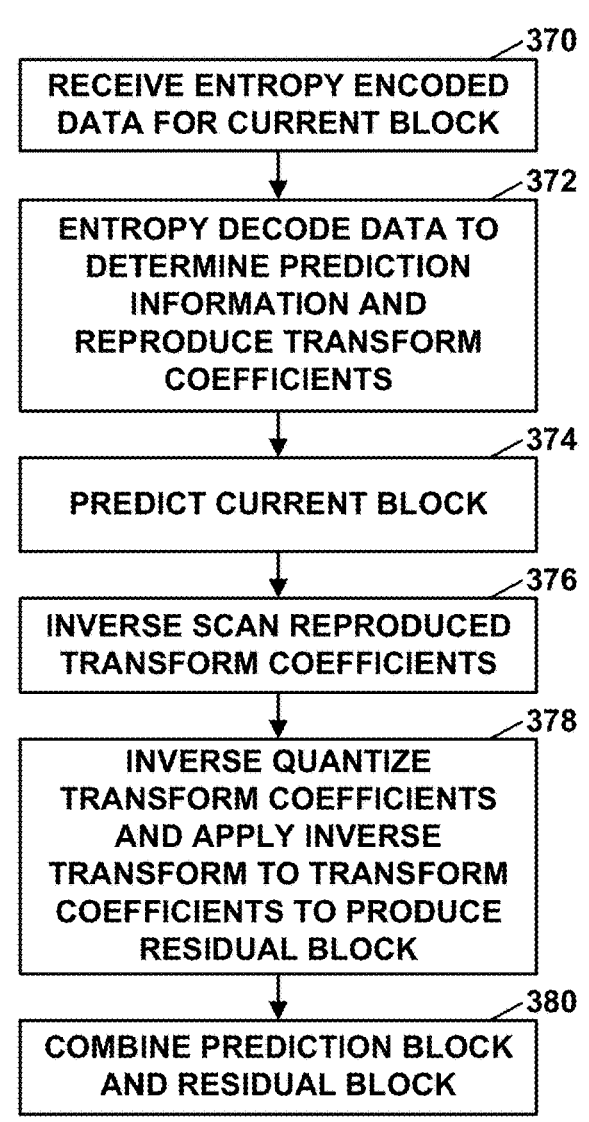
FIG. 17 is a flowchart illustrating an example method for decoding a current block in accordance with the techniques of this disclosure.

FIG. 17 is a flowchart illustrating an example method for decoding a current block of video data in accordance with the techniques of this disclosure. The current block may be or include a current CU. Although described with respect to video decoder 300 (FIGS. 1 and 15), it should be understood that other devices may be configured to perform a method similar to that of FIG. 17.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. For example, when predicting the current block, video decoder 300 may use the template matching techniques of FIG. 13. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

The following numbered clauses illustrate one or more aspects of the devices and techniques described in this disclosure.

Clause 1A. A method of coding video data, the method comprising: determining at least one part of a template based on availability of neighboring blocks of the video data, the neighboring blocks neighboring a current block of the video data; performing template matching based on the template; and coding the current block based on the template matching.

Clause 2A. The method of clause 1A, wherein the at least one part comprises a left part, and wherein determining the at least one part comprises determining that all adjacent blocks left of the current block are available.

Clause 3A. The method of clause 2A, wherein the current block comprises a block adjacent to a top picture boundary, but not adjacent to a left picture boundary.

Clause 4A. The method of any of clauses 1A-3A, wherein the at least one part comprises an above part, and wherein determining the at least one part comprises determining that all adjacent blocks above the current block are available.

Clause 5A. The method of clause 4A, wherein the current block comprises a block not adjacent to a top picture boundary, but adjacent to a left picture boundary.

Clause 6A. The method of any of clauses 1A-5A, wherein the at least one part comprises an above-left part, and wherein determining the at least one part comprises determining that a neighboring block left and above the current block is available.

Clause 7A. The method of any of clauses 1A-6A, further comprising: determining that neighboring blocks left and below the current block are available; and based on neighboring blocks left and below the current block being available, extending the left part downward.

Clause 8A. The method of any of clauses 1A-7A, further comprising: determining that neighboring blocks above and right of the current block are available; and based on neighboring blocks above and right of the current block being available, extending the above part to rightward.

Clause 9A. A method of coding video data, the method comprising: determining a search range; determining that a reference block of the video data is entirely within the search range; based on the reference block being entirely within the search range, performing template matching between the reference block and a current block of the video data; and coding the current block based on the template matching.

Clause 10A. The method of clause 9A, further comprising determining that the reference block and a template of the reference block are entirely within a picture and wherein performing the template matching is further based on the reference block and the template of the reference block being entirely within the picture.

Clause 11A. The method of clause 9A or clause 10A, wherein a template of the reference block comprises at least two of a left part, an above-left part, or an above part and wherein a top-left sample of the reference block is offset in both a vertical direction and a horizontal direction by a size of the template from a picture border.

Clause 12A. The method of clause 9A or clause 10A, wherein a template of the reference block comprises only a left part and wherein a top-left sample of the reference block is offset in a horizontal direction by a size of the template from a picture border.

Clause 13A. The method of clause 12A, wherein at one searched reference block of the template matching is adjacent to a top picture boundary, but not adjacent to a left picture boundary.

Clause 14A. The method of clause 9A or clause 10A, wherein a template of the reference block comprises only an above part and wherein a top-left sample of the reference block is offset in a vertical direction by a size of the template from a picture border.

Clause 15A. The method of clause 14A, wherein at one searched reference block of the template matching is adjacent to a left picture boundary, but not adjacent to a top picture boundary.

Clause 16A. The method of clause 9A, further comprising: determining that a template of the reference block is not entirely within a picture; and based on the template of the reference block not being entirely within the picture, padding an unavailable template part.

Clause 17A. The method of clause 16A, wherein the reference block has an L-shaped template and is adjacent at least one of a left picture border or a top picture border.

Clause 18A. A method of coding video data, the method comprising: determining a search region based on areas that are already decoded; performing template matching based on the search region; and coding a current block of the video data based on the template matching.

Clause 19A. The method of clause 18A, wherein the search region comprises all blocks wholly or partially located inside a current block and being completely reconstructed.

Clause 20A. A method of coding video data, the method comprising: performing a template matching search; performing a refinement template matching search on results of the template matching search, wherein the refinement template matching search comprises searching in a plurality of search regions; and coding a current block of the video data based on the refinement template matching search.

Clause 21A. The method of clause 20A, further comprising determining a best match having a lowest template cost based on samples in a plurality of search regions.

Clause 22A. A method of coding video data, the method comprising: determining that samples of a reference block of the video data are unavailable; based on samples of the reference block being unavailable, copying samples from respective corresponding positions in a current block of the video data; and coding the current block based on the reference block.

Clause 23A. The method of any of clauses 1A-22A, wherein coding comprises decoding.

Clause 24A. The method of any of clauses 1A-23A, wherein coding comprises encoding.

Clause 25A. A device for coding video data, the device comprising one or more means for performing the method of any of clauses 1A-24A.

Clause 26A. The device of clause 25A, wherein the one or more means comprise one or more processors implemented in circuitry.

Clause 27A. The device of any of clauses 25A and 26A, further comprising a memory to store the video data.

Clause 28A. The device of any of clauses 25A-27A, further comprising a display configured to display decoded video data.

Clause 29A. The device of any of clauses 25A-28A, wherein the device comprises one or more of a camera, a computer, a mobile device, a broadcast receiver device, or a set-top box.

Clause 30A. The device of any of clauses 25A-29A, wherein the device comprises a video decoder.

Clause 31A. The device of any of clauses 25A-30A, wherein the device comprises a video encoder.

Clause 32A. A computer-readable storage medium having stored thereon instructions that, when executed, cause one or more processors to perform the method of any of clauses 1A-24A.

Clause 33A. A device for encoding video data, the device comprising: means for performing the method of any of clauses 1A-24A.

Clause 1B. A method of coding video data, the method comprising: determining a current template of a current block of the video data; determining a potential reference block in a picture of the video data for the current block; determining that the potential reference block and a reference template of the potential reference block are entirely within the picture, the reference template having a same shape as the current template; based on the potential reference block and the reference template both being entirely within the picture, performing template matching between the reference template and the current template; and coding the current block based on the template matching.

Clause 2B. The method of clause 1B, wherein the potential reference block is a first potential reference block and wherein the reference template is a first reference template, and wherein the method further comprises: determining that at least one of a second potential reference block or a second reference template of the second potential reference block is not entirely within the picture; and based on the at least one of the second potential reference block or a second reference template not being entirely within the picture, not performing template matching between the second reference template and a current template of a current block of the video data; and coding the current block using a reference block other than the second potential reference block.

Clause 3B. The method of clause 1B or clause 2B, wherein the reference template comprises at least two of a left part, an above-left part, or an above part and wherein a top-left sample of the potential reference block is offset in a vertical direction by a width of at least one of the above-left part or the above part from a top picture boundary, and offset in a horizontal direction by at least a width of at least one of the left part or the above-left part from a left picture boundary.

Clause 4B. The method of clause 1B or clause 2B, wherein the reference template comprises only a left part and wherein a top-left sample of the potential reference block is offset in a horizontal direction by a width of the left part from a left picture boundary, and wherein the potential reference block is adjacent to a top picture boundary, but not adjacent to the left picture boundary.

Clause 5B. The method of clause 1B or clause 2B, wherein the reference template comprises only an above part and wherein a top-left sample of the potential reference block is offset in a vertical direction by a width of the above part from a top picture boundary, and wherein the potential reference block is adjacent to a left picture boundary, but not adjacent to a top picture boundary.

Clause 6B. The method of any of clauses 1B-5B, wherein the potential reference block is one of a plurality of potential reference blocks, further comprising: determining a search region of the picture for the plurality of potential reference blocks to include all blocks wholly or partially located inside a current coding tree unit (CTU) of the video data that are completely reconstructed; and determining that the potential reference block is within the search region.

Clause 7B. The method of clause 6B, wherein the search region comprises one search region of a plurality of search regions, the method further comprising performing a refinement template matching search on results of the template matching search, wherein the refinement template matching search comprises searching in the plurality of search regions.

Clause 8B. The method of any of clauses 1B-7B, wherein the current template comprises at least one part, and wherein determining the current template comprises determining the at least one part based on availability of adjacent blocks to the current block.

Clause 9B. The method of clause 8B, wherein the at least one part comprises a left part, and wherein determining the at least one part comprises determining that all adjacent blocks left of the current block are available, and wherein the current block comprises a block adjacent to a top picture boundary, but not adjacent to a left picture boundary.

Clause 10B. The method of clause 8B, wherein the at least one part comprises an above part, and wherein determining the at least one part comprises determining that all adjacent blocks above the current block are available, and wherein the current block comprises a block not adjacent to a top picture boundary, but adjacent to a left picture boundary.

Clause 11B. The method of clause 8B, wherein the at least one part comprises an above-left part, and wherein determining the at least one part comprises determining that a neighboring block left and above the current block is available.

Clause 12B. The method of clause 8B or clause 9B, further comprising: determining that neighboring blocks left and below the current block are available; and based on neighboring blocks left and below the current block being available, extending a left part downward so that a bottom of the left part is lower in a vertical direction than a bottom of the current block.

Clause 13B. The method of clause 8B or clause 10B, further comprising: determining that neighboring blocks above and right of the current block are available; and based on neighboring blocks above and right of the current block being available, extending an above part to rightward so that a right edge of the above part is further right in a horizontal direction than a right edge of the current block.

Clause 14B. The method of clause 1B-13B, wherein coding comprises decoding.

Clause 15B. The method of clause 1B-13B, wherein coding comprises encoding.

Clause 16B. A device for coding video data, the device comprising: one or more memories configured to store the video data; and one or more processors, implemented in circuitry and communicatively coupled to the one or more memories, the one or more processors being configured to: determine a current template of a current block of the video data; determine a potential reference block in a picture of the video data for the current block; determine that the potential reference block and a reference template of the potential reference block are entirely within the picture, the reference template having a same shape as the current template; based on the potential reference block and the reference template both being entirely within the picture, perform template matching between the reference template and the current template; and code the current block based on the template matching.

Clause 17B. The device of clause 16B, wherein the current template comprises at least one part, and wherein as part of determining the current template, the one or more processors are configured to determine the at least one part based on availability of adjacent blocks to the current block.

Clause 18B. The device of clause 16B or clause 17B, wherein code comprises decode, and wherein the device further comprises a display configured to display decoded video data.

Clause 19B. The device of clause 16B or clause 17B, wherein code comprises encode, and wherein the device further comprises a camera configured to capture the video data.

Clause 20B. Computer-readable storage media having stored thereon instructions which, when executed, cause one or more processors to: determine a current template of a current block of video data; determine a potential reference block in a picture of the video data for the current block; determine that the potential reference block and a reference template of the potential reference block are entirely within the picture, the reference template having a same shape as the current template; based on the potential reference block and the reference template both being entirely within the picture, perform template matching between the reference template and the current template; and code the current block based on the template matching.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining a current template of a current block of the video data based on availability of adjacent blocks to the current block, the current template comprising a left part, wherein the left part is extended downward so that a bottom of the left part is lower in a vertical direction than a bottom of the current block;
   determining a potential reference block in a picture of the video data for the current block;
   determining that the potential reference block and a reference template of the potential reference block are entirely within the picture, the reference template having a same shape as the current template;

based on the potential reference block and the reference template both being entirely within the picture, performing template matching between the reference template and the current template; and coding the current block based on the template matching.

2. The method of claim 1, wherein the potential reference block is a first potential reference block and wherein the reference template is a first reference template, and wherein the method further comprises:

determining that at least one of a second potential reference block or a second reference template of the second potential reference block is not entirely within the picture; and based on the at least one of the second potential reference block or a second reference template not being entirely within the picture, not performing template matching between the second reference template and a current template of a current block of the video data; and coding the current block using a reference block other than the second potential reference block.

3. The method of claim 1, wherein the reference template comprises at least two of the left part, an above-left part, or an above part and wherein a top-left sample of the potential reference block is offset in the vertical direction by a width of at least one of the above-left part or the above part from a top picture boundary, and offset in a horizontal direction by at least a width of at least one of the left part or the above-left part from a left picture boundary.

4. The method of claim 1, wherein the reference template comprises only the left part and wherein a top-left sample of the potential reference block is offset in the horizontal direction by a width of the left part from a left picture boundary, and wherein the potential reference block is adjacent to a top picture boundary, but not adjacent to the left picture boundary.

5. The method of claim 1, wherein the potential reference block is one of a plurality of potential reference blocks, further comprising:

determining a search region of the picture for the plurality of potential reference blocks to include all blocks wholly or partially located inside a current coding tree unit (CTU) of the video data that are completely reconstructed; and determining that the potential reference block is within the search region.

6. The method of claim 5, wherein the search region comprises one search region of a plurality of search regions, the method further comprising performing a refinement template matching search on results of the template matching search, wherein the refinement template matching search comprises searching in the plurality of search regions.

7. The method of claim 1, wherein determining the current template comprises determining that all adjacent blocks left of the current block are available, and wherein the current block comprises a block adjacent to a top picture boundary, but not adjacent to a left picture boundary.

8. The method of claim 1, wherein the current template comprises an above part, and wherein determining the current template comprises determining that all adjacent blocks above the current block are available, and wherein the current block comprises a block not adjacent to a top picture boundary, but adjacent to a left picture boundary.

9. The method of claim 1, wherein the current template comprises an above-left part, and wherein determining the current template comprises determining that a neighboring block left and above the current block is available.

10. The method of claim 1, further comprising:

determining that neighboring blocks left and below the current block are available; and based on neighboring blocks left and below the current block being available, extending the left part downward.

11. The method of claim 1, wherein the current template comprises an above part, the method further comprising:

determining that neighboring blocks above and right of the current block are available; and based on neighboring blocks above and right of the current block being available, extending the above part to rightward so that a right edge of the above part is further right in a horizontal direction than a right edge of the current block.

12. The method of claim 1, wherein coding comprises decoding.

13. The method of claim 1, wherein coding comprises encoding.

14. A device for coding video data, the device comprising:

one or more memories configured to store the video data; and one or more processors, implemented in circuitry and communicatively coupled to the one or more memories, the one or more processors being configured to:

determine a current template of a current block of the video data based on availability of adjacent blocks to the current block, the current template comprising a left part, wherein the left part is extended downward so that a bottom of the left part is lower in a vertical direction than a bottom of the current block;

determine a potential reference block in a picture of the video data for the current block;

determine that the potential reference block and a reference template of the potential reference block are entirely within the picture, the reference template having a same shape as the current template;

based on the potential reference block and the reference template both being entirely within the picture, perform template matching between the reference template and the current template; and code the current block based on the template matching.

15. The device of claim 14, wherein code comprises decode, and wherein the device further comprises a display configured to display decoded video data.

16. The device of claim 14, wherein code comprises encode, and wherein the device further comprises a camera configured to capture the video data.

17. A method of coding video data, the method comprising:

determining a current template of a current block of the video data based on availability of adjacent blocks to the current block, the current template comprising an above part, wherein the above part is extended rightward so that a right edge of the above part is further right in a horizontal direction than a right edge of the current block;

determining a potential reference block in a picture of the video data for the current block;

determining that the potential reference block and a reference template of the potential reference block are entirely within the picture, the reference template having a same shape as the current template;

based on the potential reference block and the reference template both being entirely within the picture, performing template matching between the reference template and the current template; and coding the current block based on the template matching.

18. The method of claim 17, wherein the potential reference block is a first potential reference block and wherein the reference template is a first reference template, and wherein the method further comprises:

determining that at least one of a second potential reference block or a second reference template of the second potential reference block is not entirely within the picture; and based on the at least one of the second potential reference block or a second reference template not being entirely within the picture, not performing template matching between the second reference template and a current template of a current block of the video data; and coding the current block using a reference block other than the second potential reference block.

19. The method of claim 17, wherein the reference template comprises at least two of a left part, an above-left part, or the above part and wherein a top-left sample of the potential reference block is offset in a vertical direction by a width of at least one of the above-left part or the above part from a top picture boundary, and offset in the horizontal direction by at least a width of at least one of the left part or the above-left part from a left picture boundary.

20. The method of claim 17, wherein the reference template comprises only the above part and wherein a top-left sample of the potential reference block is offset in the vertical direction by a width of the above part from a top picture boundary, and wherein the potential reference block is adjacent to a left picture boundary, but not adjacent to a top picture boundary.

21. The method of claim 17, wherein the potential reference block is one of a plurality of potential reference blocks, further comprising:

determining a search region of the picture for the plurality of potential reference blocks to include all blocks wholly or partially located inside a current coding tree unit (CTU) of the video data that are completely reconstructed; and determining that the potential reference block is within the search region.

22. The method of claim 21, wherein the search region comprises one search region of a plurality of search regions, the method further comprising performing a refinement template matching search on results of the template matching search, wherein the refinement template matching search comprises searching in the plurality of search regions.

23. The method of claim 17, wherein the current template comprises a left part, and wherein determining the current template part comprises determining that all adjacent blocks left of the current block are available, and wherein the current block comprises a block adjacent to a top picture boundary, but not adjacent to a left picture boundary.

24. The method of claim 17, wherein determining the current template comprises determining that all adjacent blocks above the current block are available, and wherein the current block comprises a block not adjacent to a top picture boundary, but adjacent to a left picture boundary.

25. The method of claim 17, wherein the current template comprises an above-left part, and wherein determining the current template comprises determining that a neighboring block left and above the current block is available.

26. The method of claim 17, wherein the current template comprises a left part, the method further comprising:

determining that neighboring blocks left and below the current block are available; and based on neighboring blocks left and below the current block being available, extending the left part downward.

27. The method of claim 17, further comprising:

determining that neighboring blocks above and right of the current block are available; and based on neighboring blocks above and right of the current block being available, extending the above part to rightward.

28. The method of claim 17, wherein coding comprises decoding.

29. The method of claim 17, wherein coding comprises encoding.

30. A device for coding video data, the device comprising:

one or more memories configured to store the video data; and one or more processors, implemented in circuitry and communicatively coupled to the one or more memories, the one or more processors being configured to:

determine a current template of a current block of the video data based on availability of adjacent blocks to the current block, the current template comprising an above part, wherein the above part is extended rightward so that a right edge of the above part is further right in a horizontal direction than a right edge of the current block;

determine a potential reference block in a picture of the video data for the current block;

determine that the potential reference block and a reference template of the potential reference block are entirely within the picture, the reference template having a same shape as the current template;

based on the potential reference block and the reference template both being entirely within the picture, perform template matching between the reference template and the current template; and code the current block based on the template matching.

31. The device of claim 30, wherein code comprises decode, and wherein the device further comprises a display configured to display decoded video data.

32. The device of claim 30, wherein code comprises encode, and wherein the device further comprises a camera configured to capture the video data.

* * * * *